United States Patent
Abedini et al.

(10) Patent No.: US 11,696,223 B2
(45) Date of Patent: Jul. 4, 2023

(54) TECHNIQUES FOR TRANSMITTING REMAINING MINIMUM SYSTEM INFORMATION

(71) Applicant: QUALCOMM Incorporated, San Diego, CA (US)

(72) Inventors: Navid Abedini, Basking Ridge, NJ (US); Kapil Gulati, Belle Mead, NJ (US); Jianghong Luo, Skillman, NJ (US); Naeem Akl, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/394,689

(22) Filed: Aug. 5, 2021

(65) Prior Publication Data
US 2023/0041878 A1     Feb. 9, 2023

(51) Int. Cl.
*H04W 48/16* (2009.01)
*H04W 76/10* (2018.01)
*H04W 52/02* (2009.01)
*H04W 74/08* (2009.01)

(52) U.S. Cl.
CPC ....... *H04W 48/16* (2013.01); *H04W 52/0206* (2013.01); *H04W 74/0833* (2013.01); *H04W 76/10* (2018.02)

(58) Field of Classification Search
CPC ............. H04W 48/16; H04W 52/0206; H04W 74/0833; H04W 76/10
See application file for complete search history.

(56) References Cited

U.S. PATENT DOCUMENTS

2022/0400451 A1*  12/2022  Luo ..................... H04W 56/001

FOREIGN PATENT DOCUMENTS

CN          112969239 A      6/2021

OTHER PUBLICATIONS

International Search Report and Written Opinion—PCT/US2022/038006—ISA/EPO—dated Oct. 28, 2022.
ZTE, et al., "NR-PBCH and Delivery of Minimum SI", R1-1700101, 3GPP TSG RAN WG1 AH_NR Meeting, 3rd Generation Partnership Project (3GPP), Mobile Competence Centre, 650, Route Des Lucioles, F-06921 Sophia-Antipolis Cedex, France, vol. RAN WG1, No. Spokana, USA, Jan. 16, 2017-Jan. 20, 2017, Jan. 10, 2017, XP051202608, 8 Pages, paragraph [04 .1].

* cited by examiner

*Primary Examiner* — Diane D Mizrahi
(74) *Attorney, Agent, or Firm* — Holland & Hart LLP

(57) ABSTRACT

Methods, systems, and devices for wireless communications are described. A base station may determine to operate in accordance with an energy saving mode in which the base station only transmits remaining minimum system information (RMSI) on-demand or reduces transmission of RMSI with respect to when the base station is operating outside of the energy saving mode. A user equipment (UE) may detect the base station that is operating in an energy saving mode. The UE may transmit a request for the base station to transmit the RMSI to the UE, where the UE may transmit the request to the energy saving base station or to a serving base station of the UE. The UE may receive, from the base station operating in the energy saving mode and responsive to the request, a message including the remaining minimum system information.

30 Claims, 18 Drawing Sheets

TECHNIQUES FOR TRANSMITTING REMAINING MINIMUM SYSTEM INFORMATION

FIELD OF TECHNOLOGY

The following relates to wireless communications, including techniques for transmitting remaining minimum system information (RMSI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some implementations, a base station may beam sweep signals including system information. A UE may detect the base station based on receiving one or more of the signals and use the system information to establish a connection the base station. Techniques for performing the beam sweeping procedure may be improved.

SUMMARY

The described techniques relate to improved methods, systems, devices, and apparatuses that support techniques for transmitting remaining minimum system information (RMSI). Generally, the described techniques provide for improved methods of establishing a connection between a base station and user equipment (UE). To reduce resource usage at a base station, the base station (e.g., an energy saving base station) may be configured to refrain from transmitting RMSI unless the base station receives a request for the RMSI, or the base station may reduce the rate at which the base station transits RMSI. For example, a base station may determine to operate in accordance with an energy saving mode in which the base station only transmits RMSI on-demand or reduces transmission of RMSI with respect to when the base station is operating outside of the energy saving mode. A UE may detect the base station that is operating in an energy saving mode. The UE may transmit a request for the base station to transmit the RMSI to the UE, where the UE may transmit the request to the energy saving base station or to a serving base station of the UE. The UE may receive, from the base station operating in the energy saving mode and responsive to the request, a message including the RMSI.

A method for wireless communications at a UE is described. The method may include detecting a base station that is operating in an energy saving mode that includes the base station only transmitting RMSI on-demand, transmitting a request for the base station to transmit the RMSI to the UE, and receiving, from the base station and responsive to the request, a message including the RMSI.

An apparatus for wireless communications at a UE is described. The apparatus may include a processor, memory coupled with the processor, and instructions stored in the memory. The instructions may be executable by the processor to cause the apparatus to detect a base station that is operating in an energy saving mode that includes the base station only transmitting RMSI on-demand, transmit a request for the base station to transmit the RMSI to the UE, and receive, from the base station and responsive to the request, a message including the RMSI.

Another apparatus for wireless communications at a UE is described. The apparatus may include means for detecting a base station that is operating in an energy saving mode that includes the base station only transmitting RMSI on-demand, means for transmitting a request for the base station to transmit the RMSI to the UE, and means for receiving, from the base station and responsive to the request, a message including the RMSI.

A non-transitory computer-readable medium storing code for wireless communications at a UE is described. The code may include instructions executable by a processor to detect a base station that is operating in an energy saving mode that includes the base station only transmitting RMSI on-demand, transmit a request for the base station to transmit the RMSI to the UE, and receive, from the base station and responsive to the request, a message including the RMSI.

Some examples of the method, apparatuses, and non-transitory computer-readable medium described herein may further include operations, features, means, or instructions for receiving, from the energy saving base station, a synchronization signal block prior to transmitting the request and determining to perform a random access procedure with the energy saving base station based on the synchronization signal block.

In some examples of the method, apparatuses, and non-transitory computer-readable medium described herein, transmitting the request may include operations, features, means, or instructions for identifying a set of resources associated with the synchronization signal block and transmitting, to the energy saving base station, the request for the RMSI using the set of resources.

In some examples of the method, apparatuses, and non-transitory computer-readable medium described herein, transmitting the request may include operations, features, means, or instructions for transmitting the request for the RMSI in accordance with a request configuration, the request configuration including a set of resources, a request type, or a combination thereof.

Some examples of the method, apparatuses, and non-transitory computer-readable medium described herein may further include operations, features, means, or instructions for receiving an indication of the request configuration from a serving base station of the UE or from the energy saving base station.

Some examples of the method, apparatuses, and non-transitory computer-readable medium described herein may further include operations, features, means, or instructions for receiving an indication of the request configuration in a master information block of a physical broadcast channel, in radio resource control signaling, in a system information block, a downlink control channel, or a combination thereof.

In some examples of the method, apparatuses, and non-transitory computer-readable medium described herein, transmitting the request may include operations, features, means, or instructions for transmitting a reference signal, a random access channel preamble, a random access channel, a physical uplink control channel, or a combination thereof indicating the request for the RMSI in accordance with the request type indicated by the request configuration.

In some examples of the method, apparatuses, and non-transitory computer-readable medium described herein, transmitting the request may include operations, features, means, or instructions for transmitting the request for the RMSI to a serving base station of the UE.

Some examples of the method, apparatuses, and non-transitory computer-readable medium described herein may further include operations, features, means, or instructions for receiving, from the serving base station, an indication to monitor for the RMSI from the energy saving base station, the indication including a set of resources for the UE to monitor for the RMSI.

Some examples of the method, apparatuses, and non-transitory computer-readable medium described herein may further include operations, features, means, or instructions for receiving, from the energy saving base station, a downlink control channel indicating scheduled RMSI resources on a downlink shared channel, where transmitting the request may be based on receiving the downlink control channel.

A method for wireless communications at a base station is described. The method may include determining to operate in accordance with an energy saving mode in which the base station only transmits RMSI on-demand, receiving a request to transmit the RMSI, and transmitting a message including the RMSI based on receiving the request.

An apparatus for wireless communications at a base station is described. The apparatus may include a processor, memory coupled with the processor, and instructions stored in the memory. The instructions may be executable by the processor to cause the apparatus to determine to operate in accordance with an energy saving mode in which the base station only transmits RMSI on-demand, receive a request to transmit the RMSI, and transmit a message including the RMSI based on receiving the request.

Another apparatus for wireless communications at a base station is described. The apparatus may include means for determining to operate in accordance with an energy saving mode in which the base station only transmits RMSI on-demand, means for receiving a request to transmit the RMSI, and means for transmitting a message including the RMSI based on receiving the request.

A non-transitory computer-readable medium storing code for wireless communications at a base station is described. The code may include instructions executable by a processor to determine to operate in accordance with an energy saving mode in which the base station only transmits RMSI on-demand, receive a request to transmit the RMSI, and transmit a message including the RMSI based on receiving the request.

Some examples of the method, apparatuses, and non-transitory computer-readable medium described herein may further include operations, features, means, or instructions for transmitting a set of synchronization signal blocks by beam sweeping the set of synchronization signal blocks in a set of multiple directions, receiving the request from a UE in a set of resources associated with a synchronization signal block from the set of synchronization signal blocks, and transmitting the RMSI in a direction associated with the synchronization signal block.

Some examples of the method, apparatuses, and non-transitory computer-readable medium described herein may further include operations, features, means, or instructions for transmitting the RMSI in a set of multiple directions based on receiving the request.

In some examples of the method, apparatuses, and non-transitory computer-readable medium described herein, receiving the request may include operations, features, means, or instructions for receiving, from a second base station, the request to transmit the RMSI, the request received via a backhaul link, an over-the-air transmission, or both.

In some examples of the method, apparatuses, and non-transitory computer-readable medium described herein, receiving the request may include operations, features, means, or instructions for receiving a reference signal, a random access channel preamble, a random access channel, a physical uplink control channel, or a combination thereof indicating the request for the RMSI.

Some examples of the method, apparatuses, and non-transitory computer-readable medium described herein may further include operations, features, means, or instructions for transmitting an indication of a request configuration for a second base station or UE to use to request for the RMSI, where the indication may be included in a master information block of a physical broadcast channel, or a downlink control channel.

Some examples of the method, apparatuses, and non-transitory computer-readable medium described herein may further include operations, features, means, or instructions for transmitting a downlink control channel that schedules RMSI resources in a downlink shared channel before receiving the request and refraining from transmitting the RMSI until the base station receives the request.

Some examples of the method, apparatuses, and non-transitory computer-readable medium described herein may further include operations, features, means, or instructions for transmitting a downlink control channel that schedules RMSI resources in a downlink shared channel based on receiving the request.

Some examples of the method, apparatuses, and non-transitory computer-readable medium described herein may further include operations, features, means, or instructions for monitoring for random access channel signals based on receiving the request.

A method for wireless communications at a first base station is described. The method may include establishing a connection with a UE, receiving, from the UE, a request for RMSI from a second base station that is operating in an energy saving mode that includes the second base station only transmitting the RMSI on-demand, and relaying the request to the second base station based on receiving the request.

An apparatus for wireless communications at a first base station is described. The apparatus may include a processor, memory coupled with the processor, and instructions stored in the memory. The instructions may be executable by the processor to cause the apparatus to establish a connection with a UE, receive, from the UE, a request for RMSI from a second base station that is operating in an energy saving mode that includes the second base station only transmitting the RMSI on-demand, and relay the request to the second base station based on receiving the request.

Another apparatus for wireless communications at a first base station is described. The apparatus may include means for establishing a connection with a UE, means for receiving, from the UE, a request for RMSI from a second base station that is operating in an energy saving mode that includes the second base station only transmitting the RMSI on-demand, and means for relaying the request to the second base station based on receiving the request.

A non-transitory computer-readable medium storing code for wireless communications at a first base station is described. The code may include instructions executable by a processor to establish a connection with a UE, receive, from the UE, a request for RMSI from a second base station that is operating in an energy saving mode that includes the second base station only transmitting the RMSI on-demand, and relay the request to the second base station based on receiving the request.

Some examples of the method, apparatuses, and non-transitory computer-readable medium described herein may further include operations, features, means, or instructions for transmitting, to the UE, a request configuration for the UE to use to request the RMSI from the second base station, the request configuration indicating a set of resources, a request type, or a combination thereof.

Some examples of the method, apparatuses, and non-transitory computer-readable medium described herein may further include operations, features, means, or instructions for transmitting, to the UE, an indication to monitor for the RMSI from the second base station, the indication including a set of resources for the UE to monitor for the RMSI.

A method for wireless communications at a base station is described. The method may include determining to operate in accordance with an energy saving mode in which the base station reduces transmission of RMSI with respect to when the base station is operating outside of the energy saving mode, identifying a configuration for transmitting RMSI in accordance with the energy saving mode, and transmitting RMSI in accordance with the configuration.

An apparatus for wireless communications at a base station is described. The apparatus may include a processor, memory coupled with the processor, and instructions stored in the memory. The instructions may be executable by the processor to cause the apparatus to determine to operate in accordance with an energy saving mode in which the base station reduces transmission of RMSI with respect to when the base station is operating outside of the energy saving mode, identify a configuration for transmitting RMSI in accordance with the energy saving mode, and transmit RMSI in accordance with the configuration.

Another apparatus for wireless communications at a base station is described. The apparatus may include means for determining to operate in accordance with an energy saving mode in which the base station reduces transmission of RMSI with respect to when the base station is operating outside of the energy saving mode, means for identifying a configuration for transmitting RMSI in accordance with the energy saving mode, and means for transmitting RMSI in accordance with the configuration.

A non-transitory computer-readable medium storing code for wireless communications at a base station is described. The code may include instructions executable by a processor to determine to operate in accordance with an energy saving mode in which the base station reduces transmission of RMSI with respect to when the base station is operating outside of the energy saving mode, identify a configuration for transmitting RMSI in accordance with the energy saving mode, and transmit RMSI in accordance with the configuration.

In some examples of the method, apparatuses, and non-transitory computer-readable medium described herein, transmitting the RMSI may include operations, features, means, or instructions for transmitting the RMSI in a first set of directions for a first duration and the RMSI in a second set of directions for a second duration in accordance with the configuration and transmitting, after a number of durations, the RMSI in the first set of directions for the first duration in accordance with the configuration.

Some examples of the method, apparatuses, and non-transitory computer-readable medium described herein may further include operations, features, means, or instructions for transmitting an indication of a pattern for receiving the RMSI.

In some examples of the method, apparatuses, and non-transitory computer-readable medium described herein, transmitting the indication may include operations, features, means, or instructions for transmitting a message indicating a set of directions the base station will transmit the RMSI in accordance with the pattern.

In some examples of the method, apparatuses, and non-transitory computer-readable medium described herein, the message includes a bitmap indicating the set of directions the base station will transmit the RMSI and a second set of directions that the base station will refrain from transmitting the RMSI.

In some examples of the method, apparatuses, and non-transitory computer-readable medium described herein, the message includes a time interval for receiving the RMSI in each direction of the set of directions.

In some examples of the method, apparatuses, and non-transitory computer-readable medium described herein, the message includes an index associated with each direction of the set of directions.

In some examples of the method, apparatuses, and non-transitory computer-readable medium described herein, transmitting the indication may include operations, features, means, or instructions for transmitting a primary synchronization signal, a secondary synchronization signal, a demodulation reference signal, a master information block, a physical broadcast channel, a radio resource control signal, or a combination thereof including the indication.

DETAILED DESCRIPTION

Figure 1:
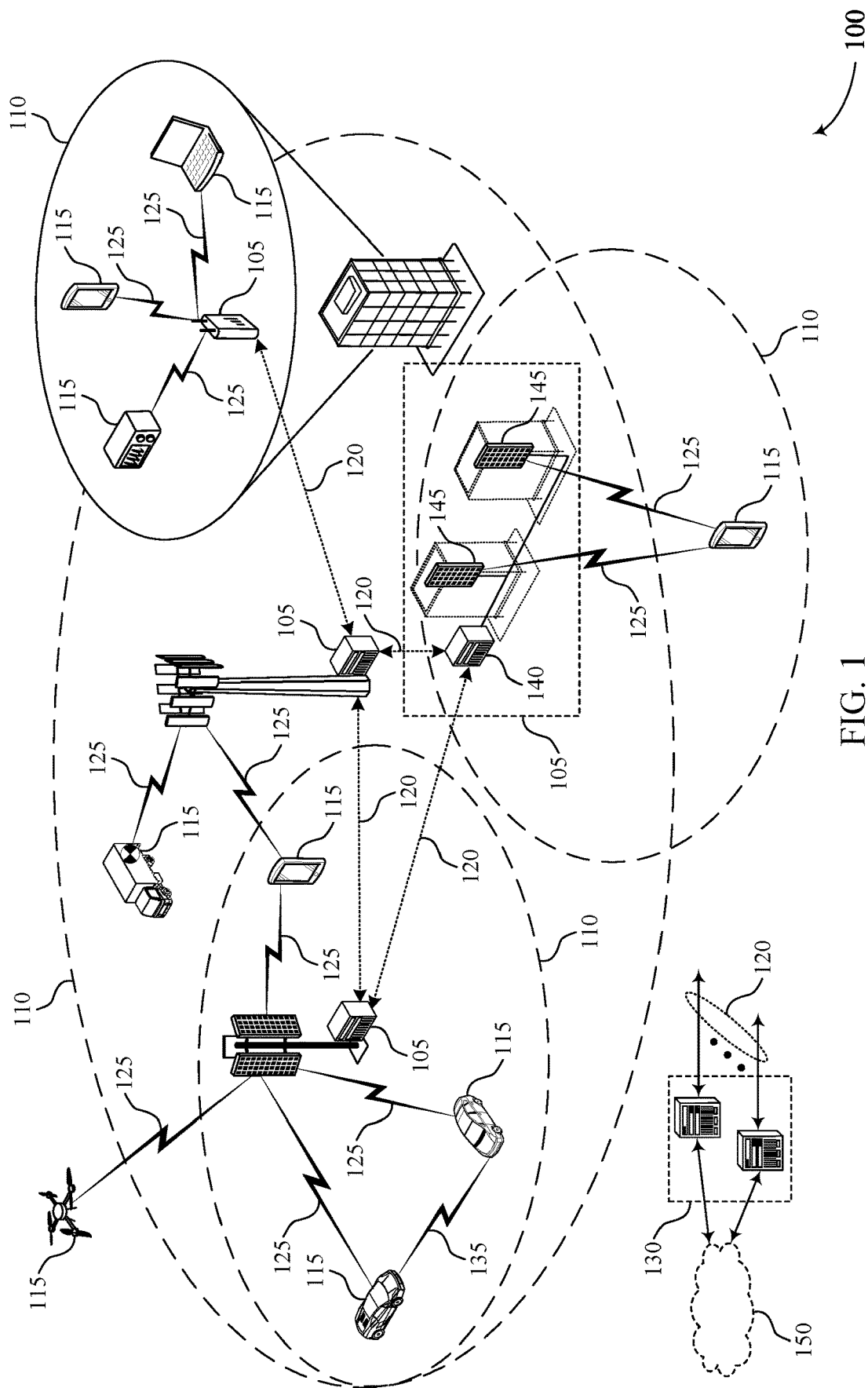
FIG. 1 illustrates an example of a wireless communications system that supports techniques for transmitting remaining minimum system information (RMSI) in accordance with aspects of the present disclosure.

In some implementations, a base station may transmit one or more signals on a plurality of beams in multiple directions (e.g., beam sweep) to allow a user equipment (UE) to detect and establish a connection with the base station. The one or more signals may include system information, where a subset of the system information may be referred to as minimum system information. The minimum system information may include a master information block (MIB) and a system information block (SIB) (e.g., SIB1). An MIB may include information related to receiving the SIB. For example, the MIB may include scheduling information of a downlink control channel (e.g., a physical downlink control channel (PDCCH)), where the downlink control channel may include scheduling information for the SIB1 included in a downlink shared channel (e.g., a physical downlink shared channel (PDSCH)). The SIB1 may be referred to as remaining minimum system information (RMSI) and may include an indication of one or more parameters associated with accessing the base station (e.g., random access parameters). As such, the base station may be configured to beam sweep at least the MIB and RMSI (e.g., SIB1), periodically, so that one or more UEs may receive the MIB and RMSI to gain access to the base station (e.g., perform a random procedure with the base station). Such a beam sweeping procedure may result in large energy consumption at the network and in some cases, the base station may not cover an area including any UEs, or each UE in the area covered by the base station may already have an established connection with the base station. Accordingly, there may not be any UEs in the area covered by the base station that need the RMSI. Therefore, the base station may inefficiently utilize resources by periodically beam sweeping the RMSI.

To reduce energy consumption of a base station and to provide for a more efficient utilization of network resources, a base station may be configured to enter an energy saving (ES) mode. In some cases, while in an ES mode, an ES base station may refrain from transmitting RMSI unless the ES base station receives a request to do so. Accordingly, the ES base station may continue beam sweeping synchronization signal blocks (SSBs) so that the ES base station is detectable to nearby devices (e.g., UEs, other base stations). A nearby device, such as a UE (e.g., that is not currently connected to the ES base station, or a UE in an RRC-idle or RRC-inactive mode), may receive one or more SSBs, and determine to establish a connection with the ES base station (e.g., handover to the base station from a serving base station). In some cases, the UE may transmit an RMSI request to the current serving base station of the UE, or the UE may transmit the RMSI request to the ES base station. As such the ES base station may receive the RMSI request from another base station (e.g., a relayed RMSI request from the current serving base station of the UE), or directly from a UE. Upon receiving the RMSI request, the ES base station may either transmit the RMSI directly to the UE, or may beam sweep the RMSI. In some cases, an ES base station may continue beam sweeping RMSI (without a first receiving a request) but at a reduced rate (e.g., in certain directions, at a reduced periodicity).

Particular aspects of the subject matter described herein may be implemented to realize one or more advantages. The described techniques may support improvements in beam sweeping operations by decreasing energy consumption by a base station related to transmitting RMSI, and improving the utilization of network resources, among other advantages. As such, supported techniques may include improved network operations and, in some examples, may promote network efficiencies, among other benefits.

Aspects of the disclosure are initially described in the context of wireless communications systems. Aspects are then described with reference to process flows. Aspects of the disclosure are further illustrated by and described with reference to apparatus diagrams, system diagrams, and flowcharts that relate to techniques for transmitting RMSI.

FIG. 1 illustrates an example of a wireless communications system 100 that supports techniques for transmitting RMSI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook).

Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

To reduce resource usage at a base station 105, the base station 105 (e.g., an energy saving base station 105) may be configured to refrain from transmitting RMSI unless the base station 105 receives a request for the RMSI, or the base station 105 may reduce the rate at which the base station 105 transits RMSI. For example, a base station 105 may determine to operate in accordance with an energy saving mode in which the base station 105 only transmits RMSI on-demand or reduces transmission of RMSI with respect to when the base station 105 is operating outside of the energy saving mode. A UE 115 may detect the base station 105 that is operating in an energy saving mode. The UE 115 may transmit a request for the base station 105 to transmit the RMSI to the UE 115, where the UE 115 may transmit the request to the energy saving base station 105 or to a serving base station 105 of the UE 115. The UE 115 may receive, from the base station 105 operating in the energy saving mode and responsive to the request, a message including the RMSI.

Figure 2:
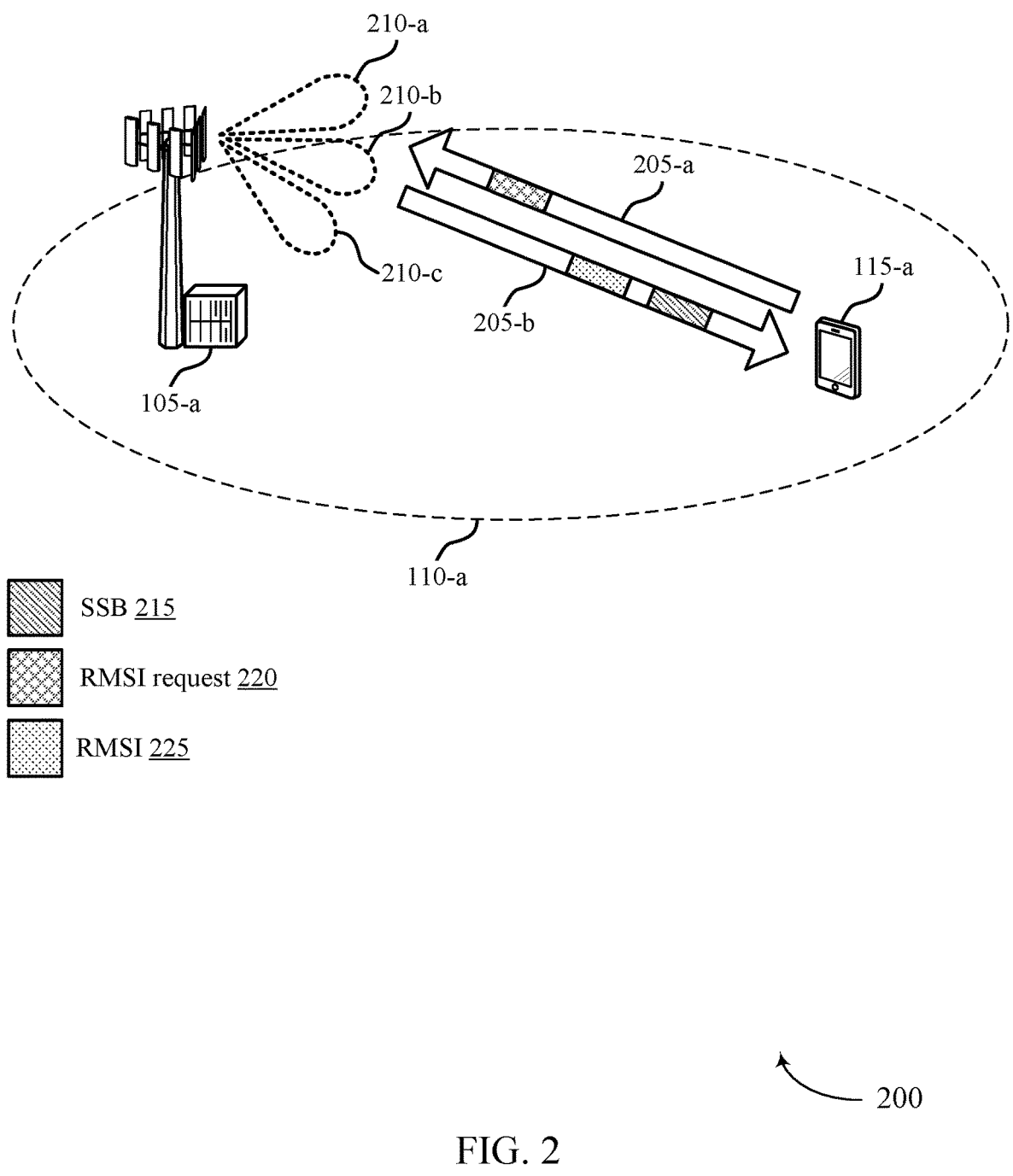
FIGS. 2 and 3 illustrate examples of wireless communications systems that support techniques for transmitting RMSI in accordance with aspects of the present disclosure.

FIG. 2 illustrates an example of a wireless communications system 200 that supports techniques for transmitting RMSI in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, base station 105-a may implement an ES mode to reduce energy consumption of base station 105-a. For example, during an ES mode, base station 105-a may refrain from transmitting a RMSI unless base station 105-a receives a request to do so or base station 105-a may otherwise reduce transmission of RMSI. Additionally or alternatively, other wireless devices, such as UE 115-a may implement a same or similar ES procedure.

In some cases, a base station 105, such as base station 105-*a* may be configured to perform a beam sweeping procedure in which base station 105-*a* may transmit one or more signals over a plurality of beams 210 directed in different directions to allow a UE 115 to detect and establish a connection with the base station 105. The one or more signals may include SSBs and other system information associated with base station 105-*a*. For example, base station 105-*a* may beam sweep SSBs over beams 210-*a*, 210-*b*, 210-*c*, or a combination thereof. Each SSB may include an MIB which may indicate scheduling information of a downlink control channel (e.g., a PDCCH) transmission by base station 105-*a*, where base station may broadcast (or beam sweep) the PDCCH. The PDCCH may include scheduling information for a PDSCH including one or more SIBs, such as SIB1.

In some cases, the MIB and SIB1 may be referred to as minimum system information and the SIB1 may be referred to as RMSI. The RMSI may include an indication of one or more parameters associated with accessing the base station (e.g., random access parameters). As such, a UE 115 may receive an SSB from a base station 105 over a beam 210 and identify information associated with receiving the RMSI. The UE 115 may determine whether to establish a connection with the base station 105 based on the SSB. For example, UE 115-*a* may be connected with a base station 105 other than base station 105-*a* and UE 115-*a* may move into coverage area 110-*a* or the network environment (e.g., weather, congestion of a base station 105) may change and UE 115-*a* may detect an SSB transmitted by base station 105-*a* via one or more beams 210. Upon transmitting the SSB, the base station 105 may be configured to beam sweep a PDCCH scheduling RMSI, and subsequently beam sweep a PDSCH including the RMSI. If the UE 115 determined to establish a connection with the base station 105, the UE 115 may monitor for and receive the RMSI via a beam 205 based on the initially received SSB, and PDCCH associated with the RMSI. The UE 115 may identify one or more parameters associated with preforming a random access procedure with the base station 105 based on the RMSI.

In some cases, such a beam sweeping procedure may result in a base station 105 utilizing a large amount of energy, and in some cases, the base station 105 may cover an area that does not include a single UE 115 that wants to connect with the base station. For example, the base station may cover an area that does not include any UEs 115 (e.g., such as due to the base station 105 being in a rural area, or otherwise experiencing low-traffic, or due to certain times of day, such as off-peak hours). In another example, the base station 105 may serve an area in which multiple UEs 115 are located. However, each UE 115 in the area may already have established a connection with base station 105. Accordingly, there may not be any UEs in the area covered by the base station 105 that need the RMSI. Therefore, the base station 105 may inefficiently utilize resources by periodically beam sweeping the RMSI.

To reduce energy consumption of a base station 105 and to provide for a more efficient utilization of network resources, a base station 105 may be configured to enter an ES mode. In some cases, the network may determine (e.g., autonomously) to enter the ES mode, or may be configured to enter an ES mode in accordance with one or more parameters (e.g., time of day, a duration if inactivity), or may receive an indication to enter an ES mode (e.g., from another base station 105, core network). In some cases, while in an ES mode, an ES base station 105 may refrain from transmitting RMSI unless the ES base station 105 receives a request to do so.

In some implementations, the ES base station 105 may continue beam sweeping SSBs so that the ES base station 105 may be detectable to nearby devices, such as UEs 115. In some cases, the ES base station 105 may refrain from transmitting a PDCCH associated with scheduling RMSI, the ES base station 105 may refrain from transmitting a PDSCH including the RMSI, the ES base station 105 may refrain from monitoring for random access channel messages, or a combination thereof unless the ES base station 105 receives a request to do so. In some cases, the ES base station 105 may transmit the SSBs in accordance with an ES mode SSB configuration. For example, the base station 105 in an ES mode may transmit SSBs in accordance with a different configuration than a base station in a non-ES mode. The ES mode SSB configuration may be changed from a non-ES mode SSB configuration to account for the ES base station 105 refraining from sequentially scheduling and transmitting RMSI. In some cases, the SSBs may be configured to include an indication that the ES base station 105 is operating in accordance with an ES mode.

Accordingly, base station 105-*a* may determine to enter into an ES mode and in accordance with the ES mode, base station 105-*a* may beam sweep SSBs over beams 210-*a*, 210-*b*, and 210-*c*. UE 115-*a* (that is not currently connected to base station 105-*a*), may receive one or more of the SSBs 215, and determine to establish a connection with base station 105-*a* (e.g., handover to base station 105-*a* from a current serving base station 105 of UE 115-*a*). Accordingly, UE 115-*a* may transmit an RMSI request via communication link 205-*a* (e.g., an uplink communications link 205-*a*). In response, base station 105-*a* may transmit (e.g., directly to UE 115-*a*, or over multiple beams 210) a PDCCH including scheduling information for RMSI 225, and subsequently transmit (e.g., directly to UE 115-*a*, or over multiple beams 210) a PDSCH including the RMSI 225.

In some implementations, the ES base station 105 may continue beam sweeping SSBs so that the ES base station 105 may be detectable to nearby devices, such as UEs 115. Additionally, the ES base station 105 may schedule RMSI and beam sweep PDCCHs. However, the ES base station 105 may refrain from transmitting the RMSI 225 until the ES base station 105 receives an RMSI request 220. In some cases, the PDCCHs may include scheduling information associated with the RMSI. In such cases, a UE 115 may receive an SSB 215 and PDCCH and the UE 115 may transmit an RMSI request 220 based on the received SSB and/or PDCCH. In response, the UE 115 may receive a PDSCH including the RMSI 225 in accordance with the scheduling information included in the PDCCH. In some cases, the ES base station 105 may transmit the PDSCH in the same direction associated with the corresponding PDCCH, or the ES base station 105 may transmit the PDSCH in a beam sweeping manner. In some cases, the PDCCH may include scheduling information for a corresponding PDSCH including the RMSI 225 and include an RMSI request grant (e.g., resources for transmitting an RMSI request 220). Accordingly, the UE 115 may receive the PDCCH, and transmit an RMSI request 220 in accordance with the grant and monitor for the RMSI in the scheduling resources. In some cases, the PDCCH may include an RMSI request grant but not scheduling information for the RMSI. Accordingly, the UE 115 may transmit an RMSI request 220 in accordance with the RMSI request grant, and monitor for a second PDCCH scheduling the RMSI. Based on receiving the second PDCCH, the UE 115 may monitor for the RMSI PDSCH. In some cases, the PDCCH including the RMSI PDSCH scheduling information, the RMSI request grant, or both may include an indication of a set of RMSI request resources, an RMSI request configuration, or both for the UE 115 to use in transmitting an RMSI request 220. The indication may be an offset to the resources over which the ES base station 105 monitors for the RMSI request 220.

In some implementations, a UE 115 may be configured with a set of parameters (e.g., resources, request configuration) for transmitting an RMSI request 220. In some cases, the UE 115 may be configured with a mapping of SSBs transmissions to RMSI request resources. The mapping may be a one-to-one mapping of SSBs transmissions to RMSI request resources such that one SSB transmission may map to one set of RMSI request resources (e.g., beam direction, time resources, frequency resources). The mapping may be a many-to-one mapping of SSBs transmissions to RMSI request resources such that multiple different SSB transmissions may map to the same set of RMSI request resources (e.g., beam direction, time resources, frequency resources). The mapping may include one-to-many mapping of SSBs transmissions to RMSI request resources such that one SSB transmission may map to multiple different sets of RMSI request resources (e.g., beam direction, time resources, frequency resources). In some cases, the UE 115 may be configured with a table including the mapping. The ES base station 105 may additionally be configured with the mapping of SSB transmissions to RMSI request resources. In some cases, the ES base station 105 may be configured to monitor for RMSI requests 220 on the resources associated with each SSB based on the mapping.

For example, a UE 115 may receive an SSB 215 and identify one or more sets of RMSI request resources associated with the received SSB. The UE 115 may transmit the RMSI request 220 on the identified set of resources and the ES base station 105 may monitor for and receive the RMSI request 220 on the set of resources. Upon receiving an RMSI request 220, the ES base station 105 may identify the SSB transmission that prompted the UE 115 to transmit the RMSI request 220 based on the mapping. Due to identifying the SSB transmission, the ES base station 105 may determine in which direction the UE 115 is, in relation to the ES base station 105. In some cases, the ES base station 105 may transmit the RMSI 225 in a same or similar direction as the identified SSB transmission so that the RMSI 225 is directed to the UE 115 that transmitted the RMSI requested. For example, UE 115-a may receive an SSB 215 over beam 210-b via communications link 205-b (e.g., a downlink communications link, a broadcast link, unicast link). UE 115-a may identify a set of RMSI request resources associated with the SSB 215 transmitted over beam 210-b. UE 115-a may transmit the RMSI request 220 in accordance with the set of RMSI resources and base station 105-b may receive the RMSI request 220. Base station 105-a may determine that the RMSI request 220 from UE 115-a was prompted by the SSB transmitted over 210-b. Accordingly, base station 105-a may transmit the RMSI 225 over beams 210-b via communications link 205-b.

In some implementations, an ES base station 105 may be configured to (e.g., preconfigured to, receive an indication to, or determine to based on one or more parameters) transmit the RMSI 225 using multiple different beams 210 in multiple directions in response to receiving one or more RMSI requests 220. For example, the ES base station 105 may receive one or more RMSI requests 220 from one or more different devices (e.g., UEs 115, base stations 105), and the ES base station 105 may determine to transmit the RMSI 225 over multiple beams, such as beams 210-a, 210-b, and 210-c. In some cases, the ES base station 105 may determine to beam sweep the RMSI 225 based on receiving multiple RMSI requests 220 or based on receiving a number of RMSI requests 220 over a threshold number. In some cases, the ES base station 105 may determine from which directions the RMSI requests 220 were transmitted which the ES base station 105 may use to determine whether to beam sweep the RMSI 225. For example, if the RMSI identifies two RMSI requests 220 were transmitted from two different directions, then the ES base station 105 may determine to beam sweep with the RMSI 225.

In some cases, the RMSI request parameters may indicate that the UE 115 transmit the RMSI request 220 in the form of a reference signal (e.g., such as a sounding reference signal (SRS)), in the form of a random access channel (RACH) preamble, in the form of a RACH message (e.g., RACH msgA that may include a RACH preamble and a message such as a payload, or PUCCH). A UE 115 may receive an indication of the RMSI request parameters (e.g., RMSI request resource mapping, request format). In some implementations, the UE 115 may be preconfigured with the RMSI request parameters. In some cases, the UE 115 may identify RMSI request parameters based on a prior indication from a network by the current serving base station 105 or by other base stations 105 (e.g., in SIB, dedicated radio resource control (RRC)). The UE 115 may receive the indication from the current serving base station 105 of the UE 115, or from the ES base station 105. For example, upon detecting an ES base station 105, the UE 115 may transmit a message to the current serving base station 105 of the UE 115, and the serving base station 105 may transmit an indication of the RMSI request parameters to the UE 115, where the RMSI request parameters indicated by the serving base station 105 may indicate parameters for transmitting the RMSI request 220 to the ES base station 105, to the serving base station 105, or both. A UE 115 may receive the indication of the RMSI request parameters aperiodically, semi-statically, or dynamically (e.g., via an RRC message, downlink control information (DCI) message, medium access control (MAC) control element (MAC-CE) message, a PDCCH, or some other broadcast message). For example, one or more information elements (IEs) in an MIB, or some other message of a physical broadcast channel (PBCH) may be repurposed or configured to indicate the RMSI request parameters to the UE 115.

In some cases, the RMSI resource parameters may be configured for a particular UE 115 (e.g., UE-specific RMSI request parameters). In some cases, the RMSI resource parameters may be group-specific, and in some cases (e.g., no contention), the RMSI resource parameters may be common or shared such that each UE 115 that detects a certain ES base station 105 may use the same configuration and/or resources for transmit an RMSI request 220.

For example, the ES base station 105 may transmit the RMSI request parameters in a PDCCH scheduling an RMSI PDSCH. In another example, the ES base station 105 may transmit the RMSI request parameters in an SSB transmission. Accordingly, the configuration of an SSB being transmitted by an ES base station 105 may change (e.g., compared to a configuration of an SSB transmitted in a non-ES mode) to include the RMSI request parameters.

In some cases, a UE 115 may be configured to transmit an RMSI request 220 directly to the ES base station 105, or the UE 115 may be configured to transmit the RMSI request 220 to the current serving base station 105 of the UE 115, as described in more detail with reference to FIG. 3.

Figure 3:
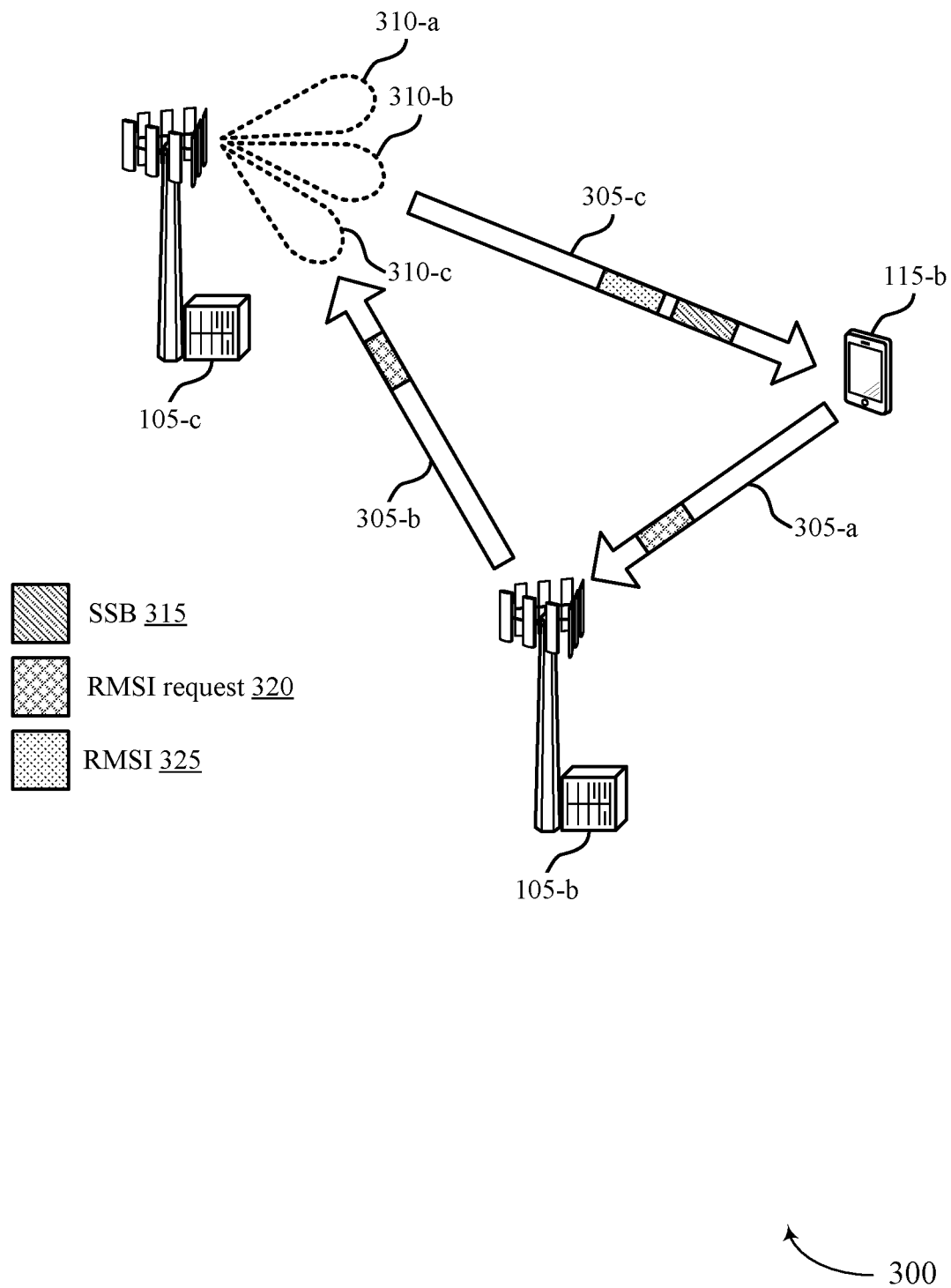

FIG. 3 illustrates an example of a wireless communications system 300 that supports techniques for transmitting RMSI in accordance with aspects of the present disclosure. The wireless communications system 300 may include base stations 105-*b* and 105-*c*, and UE 115-*b*, which may be examples of base stations 105 and a UE 115 as described with reference to FIGS. 1 and 2. Base station 105-*b* may serve a first coverage area and base station 105-*c* may serve a second coverage area, where the first coverage area and the second coverage area may overlap, or may not. In some cases, base station 105-*c* may implement an ES mode to reduce energy consumption of base station 105-*c*. For example, during an ES mode, base station 105-*c* may refrain from transmitting a RMSI unless base station 105-*c* receives a request to do so or base station 105-*c* may otherwise reduce transmission of RMSI. Additionally or alternatively, other wireless devices, such as base station 105-*b*, or UE 115-*b* may implement a same or similar ES procedure.

As described with reference to FIG. 2, a UE 115, such as UE 115 may be served by a base station 105 (e.g., a serving base station 105, such as base station 105-*b*). The UE 115 may detect one or more signals, such as SSBs, from a nearby (e.g., neighboring) base station 105, where the nearby base station 105, such as base station 105-*c*, may be operating in an ES mode. In accordance with the procedures described with reference to FIG. 2, base station 105-*c* may refrain from transmitting RMSI in a beam sweeping manner unless base station 105-*c* receives a request to do so based on the ES mode. In an ES mode, base station 105-*c* may beam sweep one or more SSBs 315 over multiple beams 310 (e.g., beams 310-*a*, 310-*b*, 310-*c*), and UE 115-*b* may receive the one or more SSBs 315.

UE 115-*b* may determine to establish a connection with base station 105-*c* and identify that base station 105-*c* is operating in an ES mode. In some cases, UE 115-*b* may determine or be configured to transmit an RMSI request 320 to the current serving base station 105 of the UE. For example, UE 115-*b* may transmit an RMSI request 320 to base station 105-*b* via communications link 305-*a* (e.g., an uplink communications link). In some cases, base station 105-*b* may identify, in the RMSI request 320, or otherwise determine an SSB index that prompted UE 115-*b* to transmit the RMSI request 320 to base station 105-*b*. In some cases, base station 105-*b* may relay or otherwise indicate the RMSI request 320 to base station 105-*c* (e.g., or to a central unit of bae station 105-*c*) via communications link 305-*b* (e.g., a backhaul link, and over-the-air communications link), where the request may indicate base station 105-*b* to transmit RMSI PDCCH, RMSI PDSCH, or both). In some cases, base station 105-*b* may transmit an acknowledgement message that base station 105-*b* indicated the RMSI request 320 to base station 105-*c*. In some cases, the relayed request may include information on one or more UEs 115 that requested the RMSI, one or more directions to transmit the RMSI, or both. For example, base station 105-*b* may include in the relayed request the SSB index that prompted UE 115-*b* to transmit the RMSI request 320 to base station 105-*b*.

In some case, UE 115-*b* may detect multiple ES base stations 105 and may transmit an RMSI request 320 to base station 105-*b* for one or more of the detected ES base station 105. In such cases, base station 105-*c* may relay one or more of the RMSI requests 320 to each respective detected ES base station 105. Upon relaying one or more RMSI requests 320 to respective ES base stations 105, base station 105-*b* may receive an indication from one or more of the ES base station 105 that the respective ES base station 105 will transmit RMSI (e.g., RMSI PDCCH, RMSI PDSCH, or both). In some cases, base station 105-*b* may transmit an indication to UE 115-*b* of the one or more ES base stations 105 that will transmit RMSI. Base station 105-*b* may indicate parameters (e.g., resources, configuration) for monitoring and/or processing an RMSI PDCCH (e.g., a PDCCH scheduling RMSI in a PDSCH), or an RMSI PDSCH (e.g., PDSCH including the RSMI), or both.

As such, base station 105-*c* may receive the RMSI request 320 from another base station 105 (e.g., a relayed RMSI request 320 from the current serving base station 105 of the UE 115), or directly from the UE 115. In some cases, base station 105-*c* may receive the RMSI request 320 directly from base station 105-*b*, or may receive the RMSI request 320 from a central unit of base station 105-*c* that received the request from base station 105-*b*. Upon receiving an RMSI request 320 from one or more base stations 105, UEs 115, or both, base station 105-*c* may transmit the RMSI directly to a UE 115 that requested the RMSI, or may beam sweep the RMSI. For example, base station 105-*a* may transmit RMSI 325 (e.g., RMSI PDCCH, RMSI, PDSCH, or both) to UE 115-*b* via communications link 305-*c* (e.g., downlink communications link, broadcast link).

In some cases, an ES base station 105 may continue beam sweeping RMSI (without a first receiving an RMSI request 320) but may beam sweep the RMSI at a reduced rate (e.g., in certain directions, at a reduced periodicity). In some cases, an ES base station 105 may be configured to transmit RMSI for a subset of SSBs or a total number of SSBs, to transmit RMSI at a reduced periodicity (e.g., compared to a non-ES mode), or a combination thereof.

In some cases, a base station 105 (e.g., cell) may include multiple TRPs, where each TRPs may be associated with one or more SSB directions. A base station 105 as a whole may or may not operate in an ES mode, but one or more TRPs associated with the base station 105 may be configured (e.g., by the base station 105) to operate in an ES mode. A subset of the TRPs of a base station 105 may be operating in an ES mode and may transit SSBs for certain purposes (e.g., discovery purposes). Some ES TRPs may be configured to transmit both SSBs and RMSI. In one example, a base station 105 may alternate across the TRPs and/or SSB directions of the base station 105 to transmit RMSI. For example, in a first duration, the base station 105 may transmit RMSI from a first set of TRPs (e.g., SSB directions). In a second duration, the base station 105 may transmit RMSI from a second set of TRPs (e.g., associated SSB directions), and so on. After K periods, the base station 105 may cycle back to the first set of TRPs for RMSI transmission, in accordance with a TRP switching pattern. In some cases, a UE 115 may receive (e.g., from the ES base station 105, or a serving base station 105) or be configured with an indication of which TRPs will transmit the RMSI during a certain duration. In some cases, the UE 115 may receive or be configured with the TRP switching pattern.

The UE 115 may receive the indication of the TRP RMSI configuration in a PSS, SSS, DMRS, or MIB, via dedicated RRC from the ES base station 105, or from a different base station 105, such as a serving base station 105. For example, a PBCH (e.g., MIB) may indicate whether there is an RMSI for the associated SSB direction or not (e.g., a one-bit indication). In another example, the UE 115 may receive or be configured with a bitmap of the SSBs and/or TRPs that may transmit RMSI. The UE 115 may be configured or receive a period offset indicating when RMSI will may be transmitted for an associated SSB direction. The UE 115 may be configured or receive an index of candidate SSBs and/or TRPs (e.g., compensating SSBs and/or TRPs) that may transmit RMSI. Accordingly, a UE 115 may identify a configuration for receiving RMSI from an ES base station 105 (e.g., or a base station 105 with ES TRPs), and monitor RMSI in accordance with the configuration.

In some implementations, reducing RMSI transmission periodicity or refraining from transmitting RMSI (without first receiving an RMSI request 320) may allow an ES base station 105 to enter in a deep sleep mode in which the base station may power off or reduce functionality of one or more operations. By entering into an ES mode in which the base station 105 may refrain from transmitting unnecessary RMSI signals, or transmitting RMSI at a reduced rate, the ES base station 105 may reduce energy consumption and load on the ES base station 105.

Figure 4:
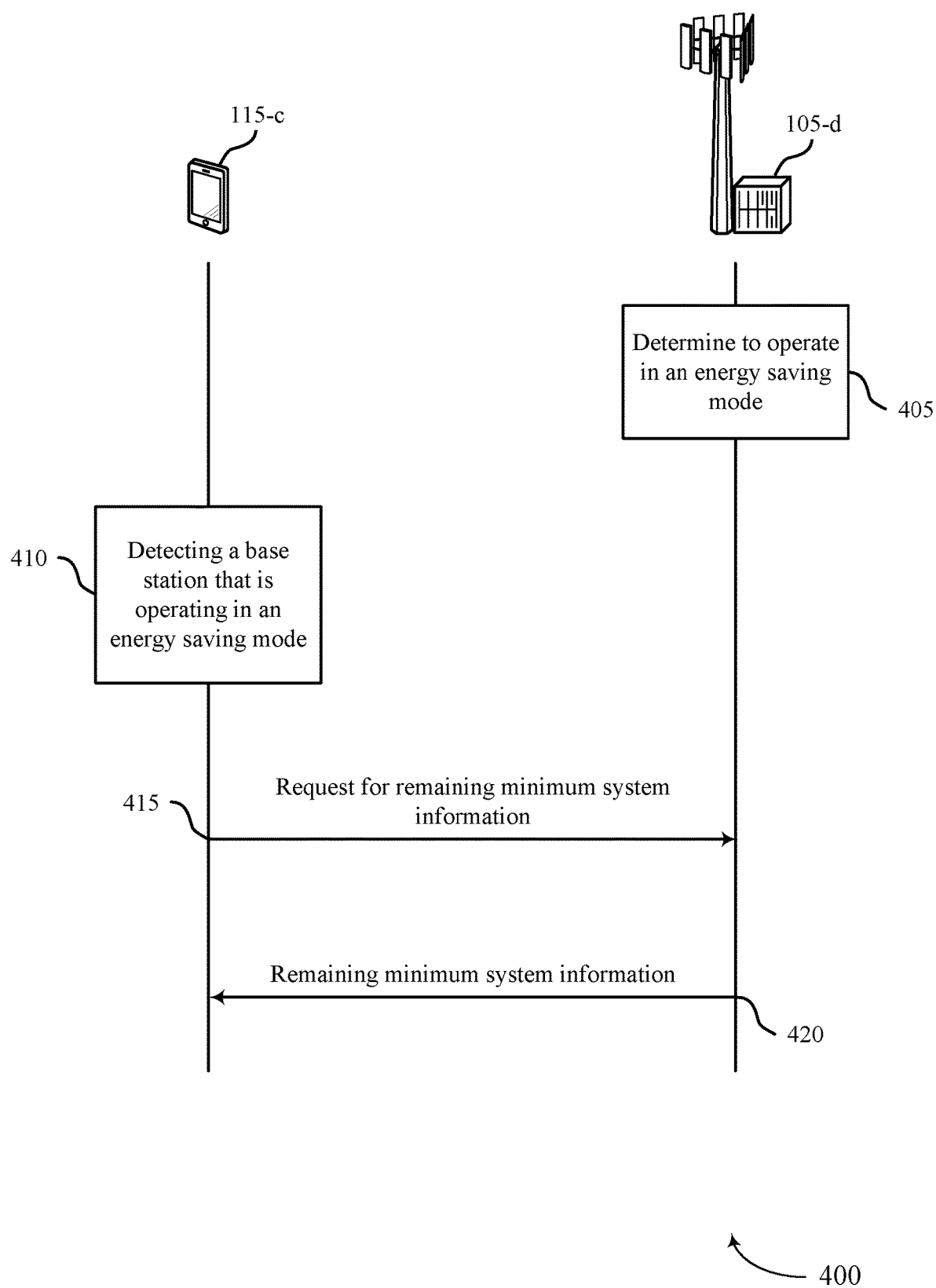
FIGS. 4, 5, and 6 illustrate example of process flows that support techniques for transmitting RMSI in accordance with aspects of the present disclosure.

FIG. 4 illustrates an example of a process flow 400 that supports techniques for transmitting RMSI in accordance with aspects of the present disclosure. The process flow 400 may illustrate an example RMSI transmission procedure. For example, base station 105-d may perform the RMSI transmission procedure to transmit RMSI to UE 115-c upon request or at a reduced rate. Base station 105-d, and UE 115-c may be examples of the corresponding wireless devices described with reference to FIGS. 1 through 3. In some cases, instead of base station 105-d implementing the RMSI transmission procedure, a different type of wireless device (e.g., a UE 115) may perform a same or similar procedure. Alternative examples of the following may be implemented, where some steps are performed in a different order than described or are not performed at all. In some cases, steps may include additional features not mentioned below, or further steps may be added.

At 405, base station 105-d may determine to operate in accordance with an energy saving mode in which the base station 105 only transmits RMSI on-demand.

At 410, UE 115-c may detect a base station 105 (e.g., base station 105-d) that is operating in an energy saving mode that includes the base station 105 only transmitting RMSI on-demand. In some cases, UE 115-c may receive, from the energy saving base station 105 (e.g., base station 105-d), a synchronization signal block prior to transmitting the request, and determine to perform a random access procedure with the energy saving base station 105 based on the synchronization signal block.

At 415, UE 115-c may transmit a request for base station 105-d to transmit the RMSI to UE 115-c. Transmitting the request may include identifying a set of resources associated with the synchronization signal block, and transmitting, to the energy saving base station 105, the request for the RMSI using the set of resources. Transmitting the request may include, transmitting the request for the RMSI in accordance with a request configuration, where the request configuration includes a set of resources, a request type, or a combination thereof. UE 115-c may receive an indication of the request configuration from a serving base station 105 of UE 115-c or from the energy saving base station 105. UE 115-c may receive an indication of the request configuration in a master information block of a physical broadcast channel, in RRC signaling, in a system information block, a downlink control channel, or a combination thereof.

Transmitting the request may include transmitting a reference signal, a random access channel preamble, a random access channel, a physical uplink control channel, or a combination thereof indicating the request for the RMSI in accordance with the request type indicated by the request configuration. UE 115-c may receive, from the energy saving base station 105, a downlink control channel indicating scheduled RMSI resources on a downlink shared channel, where transmitting the request may be based on receiving the downlink control channel.

At 420, UE 115-c may receive, from base station 105-d and responsive to the request, a message including the RMSI. In some cases, base station 105-d may transmit a set of synchronization signal blocks by beam sweeping the set of synchronization signal blocks in a plurality of directions, receive the request from UE 115-c in a set of resources associated with a synchronization signal block from the set of synchronization signal blocks, and transmit the RMSI in a direction associated with the synchronization signal block. Base station 105-f may transmit the RMSI in a plurality of directions based on receiving the request.

Figure 5:
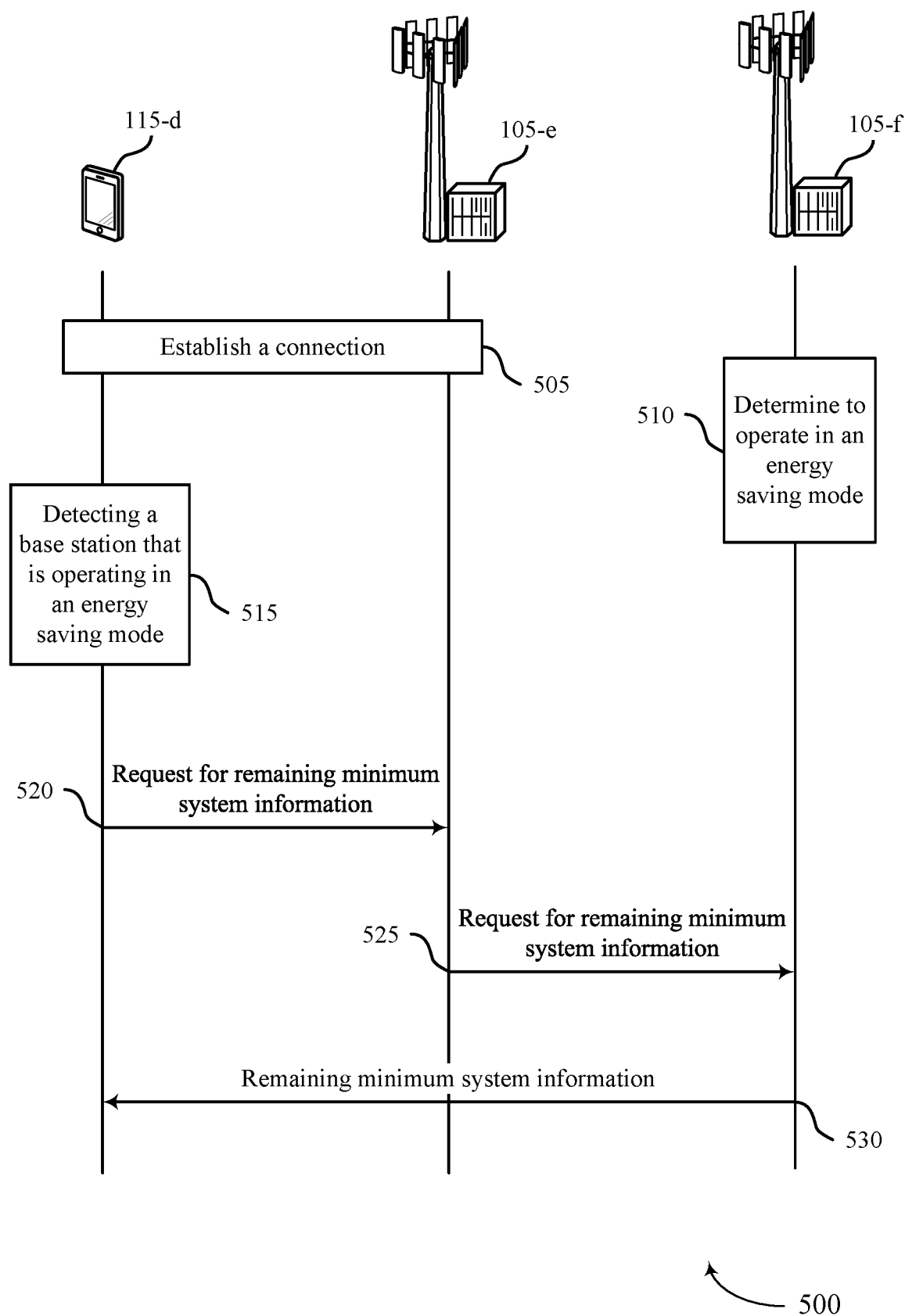

FIG. 5 illustrates an example of a process flow 500 that supports techniques for transmitting RMSI in accordance with aspects of the present disclosure. The process flow 500 may illustrate an example RMSI transmission procedure. For example, base station 105-f may perform the RMSI transmission procedure to transmit RMSI to UE 115-d upon request or at a reduced rate. Base stations 105-e and 105-f, and UE 115-d may be examples of the corresponding wireless devices described with reference to FIGS. 1 through 4. In some cases, instead of base station 105-f implementing the RMSI transmission procedure, a different type of wireless device (e.g., a UE 115) may perform a same or similar procedure. Alternative examples of the following may be implemented, where some steps are performed in a different order than described or are not performed at all. In some cases, steps may include additional features not mentioned below, or further steps may be added.

At 505, UE 115-d and base station 105-e a connection. Base station 105-e may be referred to as a serving base station 105 of UE 115-d.

At 510, base station 105-f may determine to operate in accordance with an energy saving mode in which the base station 105 only transmits RMSI on-demand.

At 515, UE 115-d may detect a base station 105 (e.g., base station 105-f) that is operating in an energy saving mode that includes the base station 105 only transmitting RMSI on-demand. In some cases, UE 115-d may receive, from the energy saving base station 105 (e.g., base station 105-d), a synchronization signal block prior to transmitting the request, and determine to perform a random access procedure with the energy saving base station 105 based on the synchronization signal block.

Base station 105-f may transmit an indication of a request configuration for a base station 105-e or UE 115-d to use to request for the RMSI, where the indication is included in a master information block of a physical broadcast channel, or a downlink control channel. In some cases, base station 105-e may transmit, to UE 115-d, a request configuration for the UE 115 to use to request the RMSI from base station 105-f, the request configuration indicating a set of resources, a request type, or a combination thereof.

In some cases, base station 105-f may transmit a downlink control channel that schedules RMSI resources in a downlink shared channel before receiving the request, and refrain from transmitting the RMSI until base station 105-f receives the request.

At 520, UE 115-c may transmit a request for base station 105-f to transmit the RMSI to UE 115-c. In some cases, and as described with reference to FIG. 4, UE 115-d may transmit the request to the energy saving base station (e.g., base station 105-f). In some other cases, UE 115-c may transmit the request for the RMSI to a serving base station 105 of UE 115-*d*. UE 115-*d* may receive, from the serving base station 105, an indication to monitor for the RMSI from the energy saving base station 105, where the indication may include a set of resources for UE 115-*d* to monitor for the RMSI. UE 115-*d* may receive, from the energy saving base station 105, a downlink control channel indicating scheduled RMSI resources on a downlink shared channel, where transmitting the request may be based on receiving the downlink control channel.

At 525, base station 105-*f* may receive, from base station 105-*e*, the request to transmit the RMSI, the request received via a backhaul link, an over-the-air transmission, or both. Receiving the request may include receiving a reference signal, a random access channel preamble, a random access channel, a physical uplink control channel, or a combination thereof indicating the request for the RMSI. Base station 105-*f* may transmit a downlink control channel that schedules RMSI resources in a downlink shared channel based on receiving the request. In some cases, base station 105-*f* may monitor for random access channel signals based on receiving the request.

In some cases, base station 105-*e* may transmit, to the UE 115, an indication to monitor for the RMSI from base station 105-*f*, the indication including a set of resources for the UE 115 to monitor for the RMSI.

At 530, UE 115-*d* may receive, from base station 105-*f* and responsive to the request, a message including the RMSI.

Figure 6:
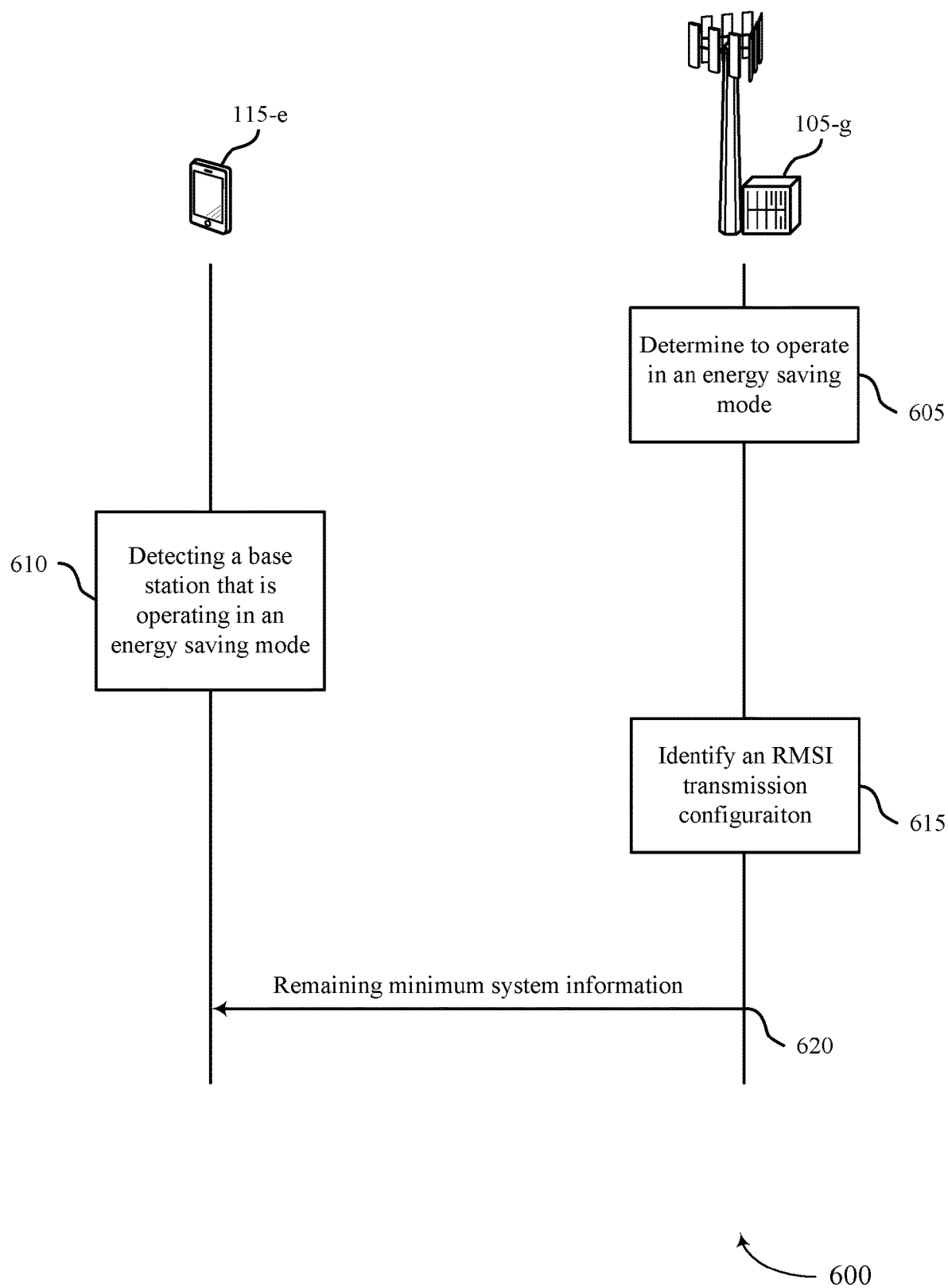

FIG. 6 illustrates an example of a process flow 600 that supports techniques for transmitting RMSI in accordance with aspects of the present disclosure. The process flow 600 may illustrate an example RMSI transmission procedure. For example, base station 105-*g* may perform the RMSI transmission procedure to transmit RMSI to UE 115-*e* upon request or at a reduced rate. Base station 105-*g* and UE 115-*e* may be examples of the corresponding wireless devices described with reference to FIGS. 1 through 5. In some cases, instead of base station 105-*g* implementing the RMSI transmission procedure, a different type of wireless device (e.g., a UE 115) may perform a same or similar procedure. Alternative examples of the following may be implemented, where some steps are performed in a different order than described or are not performed at all. In some cases, steps may include additional features not mentioned below, or further steps may be added.

At 605, base station 105-*g* may determine to operate in accordance with an energy saving mode in which the base station 105 reduces transmission of RMSI with respect to when the base station 105 is operating outside of the energy saving mode.

At 610, UE 115-*e* may UE 115-*e* may detect a base station 105 (e.g., base station 105-*g*) that is operating in an energy saving mode that includes the base station 105 transmitting RMSI at a reduced rate.

At 615, base station 105-*g* may identify a configuration for transmitting RMSI in accordance with the energy saving mode. In some cases, base station 105-*g* may transmit an indication of a pattern for receiving the RMSI. Transmitting the indication may include transmitting a message indicating a set of directions the base station 105 will transmit the RMSI in accordance with the pattern. The message may include a bitmap indicating the set of directions the base station 105 will transmit the RMSI and a second set of directions that the base station 105 will refrain from transmitting the RMSI. The message may include a time interval for receiving the RMSI in each direction of the set of directions. The message may include an index associated with each direction of the set of directions. Transmitting the indication may include transmitting a primary synchronization signal, a secondary synchronization signal, a demodulation reference signal, a master information block, a physical broadcast channel, a RRC signal, or a combination thereof including the indication.

At 620, base station 105-*g* may transmit RMSI in accordance with the configuration. Transmitting the RMSI may include transmitting the RMSI in a first set of directions for a first duration and the RMSI in a second set of directions for a second duration in accordance with the configuration, and transmit, after a number of durations, the RMSI in the first set of directions for the first duration in accordance with the configuration.

Figure 7:
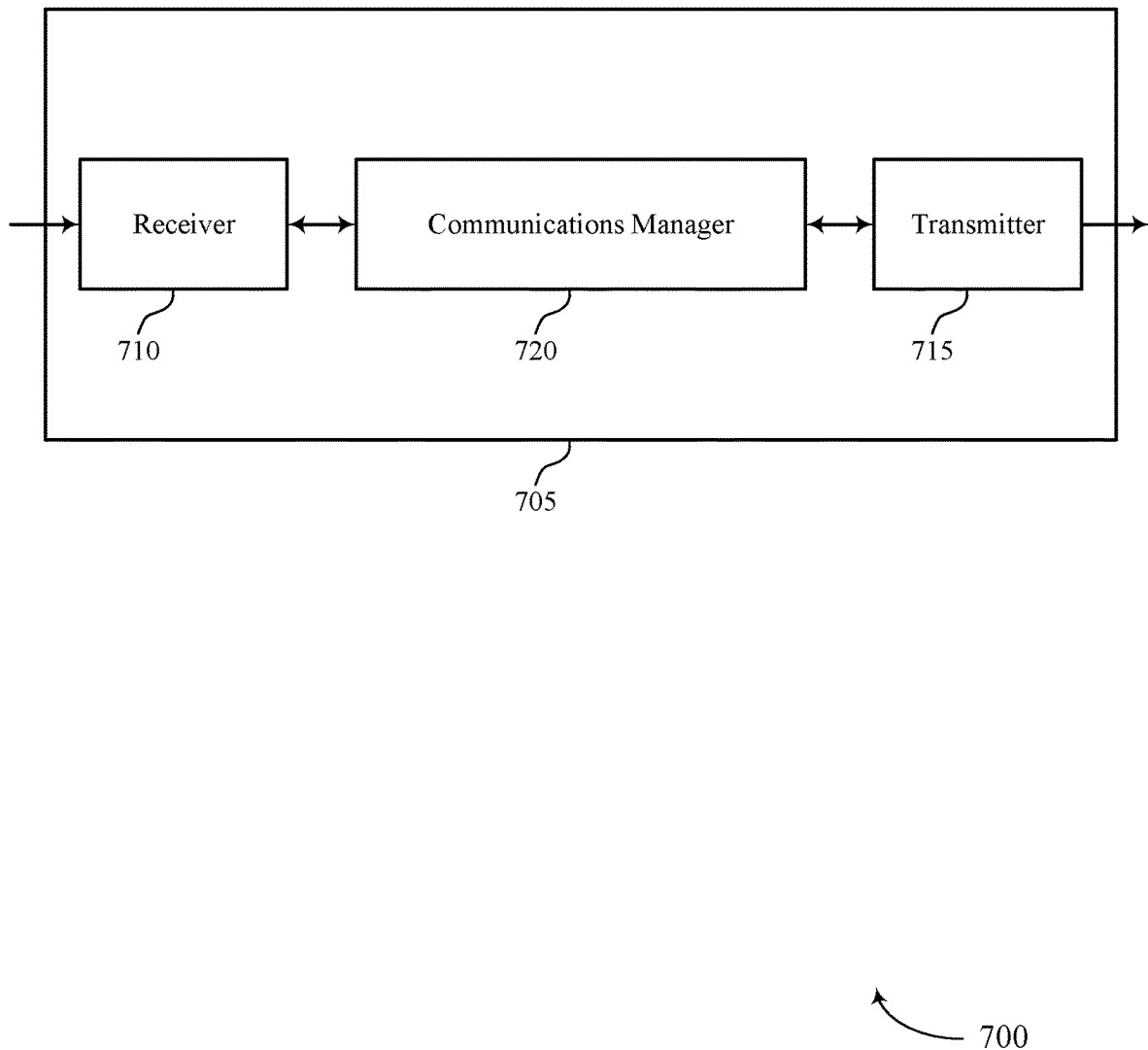
FIGS. 7 and 8 show block diagrams of devices that support techniques for transmitting RMSI in accordance with aspects of the present disclosure.

FIG. 7 shows a block diagram 700 of a device 705 that supports techniques for transmitting RMSI in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for transmitting RMSI). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for transmitting RMSI). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for transmitting RMSI as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for detecting a base station that is operating in an energy saving mode that includes the base station only transmitting RMSI on-demand. The communications manager 720 may be configured as or otherwise support a means for transmitting a request for the base station to transmit the RMSI to the UE. The communications manager 720 may be configured as or otherwise support a means for receiving, from the base station and responsive to the request, a message including the RMSI.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources.

Figure 8:
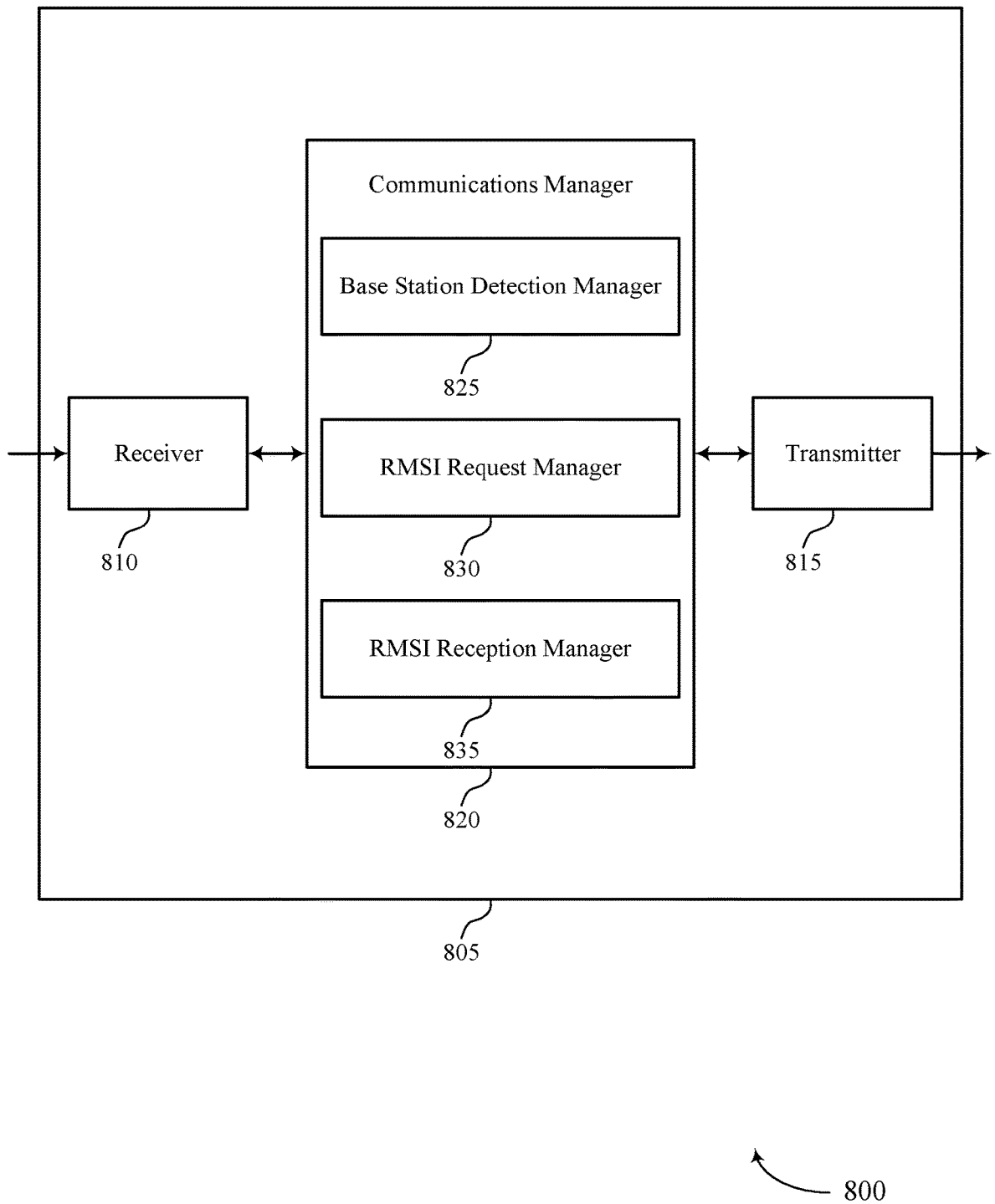

FIG. 8 shows a block diagram 800 of a device 805 that supports techniques for transmitting RMSI in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for transmitting RMSI). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for transmitting RMSI). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for transmitting RMSI as described herein. For example, the communications manager 820 may include a base station detection manager 825, an RMSI request manager 830, an RMSI reception manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The base station detection manager 825 may be configured as or otherwise support a means for detecting a base station that is operating in an energy saving mode that includes the base station only transmitting RMSI on-demand. The RMSI request manager 830 may be configured as or otherwise support a means for transmitting a request for the base station to transmit the RMSI to the UE. The RMSI reception manager 835 may be configured as or otherwise support a means for receiving, from the base station and responsive to the request, a message including the RMSI.

Figure 9:
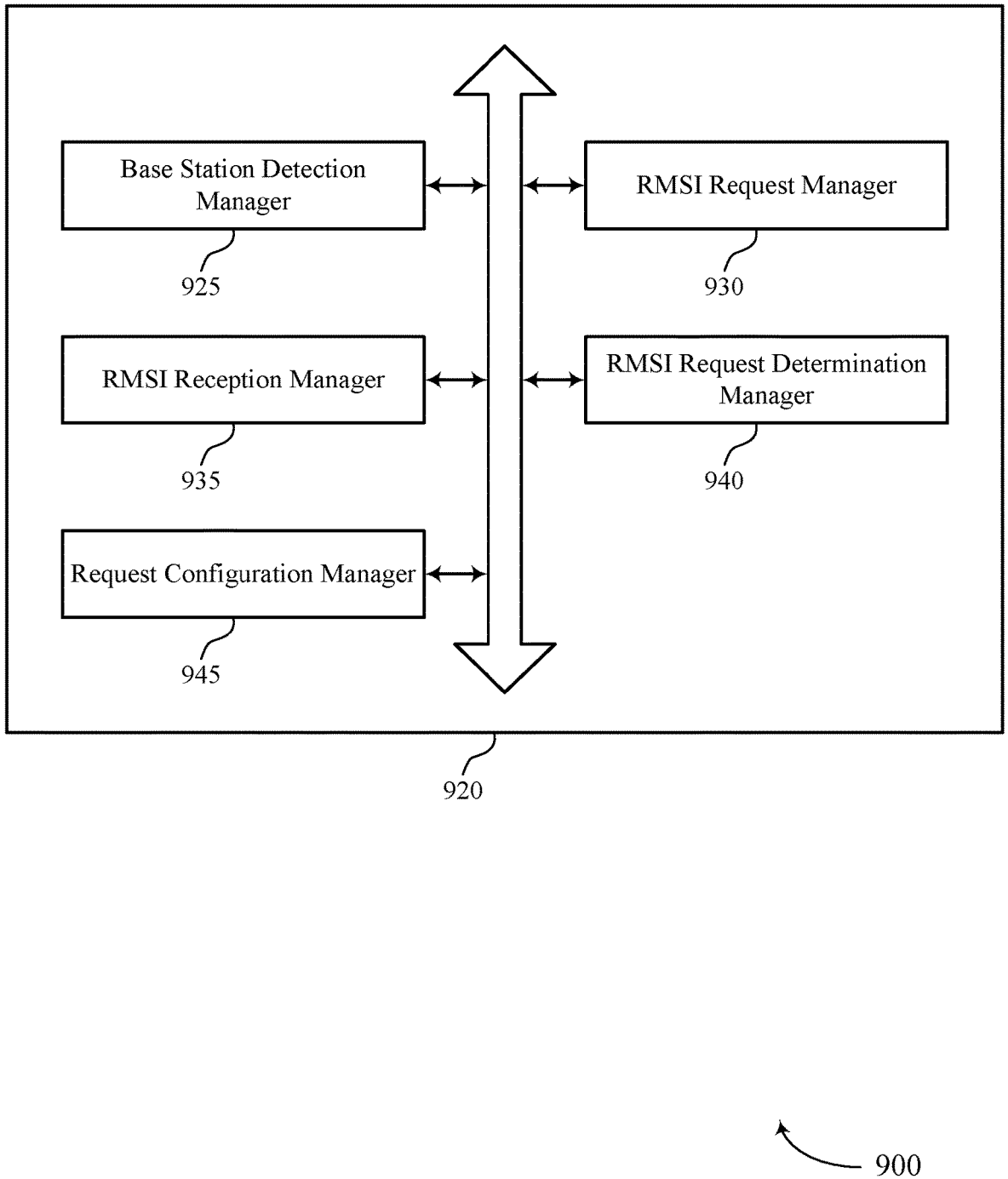
FIG. 9 shows a block diagram of a communications manager that supports techniques for transmitting RMSI in accordance with aspects of the present disclosure.

FIG. 9 shows a block diagram 900 of a communications manager 920 that supports techniques for transmitting RMSI in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for transmitting RMSI as described herein. For example, the communications manager 920 may include a base station detection manager 925, an RMSI request manager 930, an RMSI reception manager 935, an RMSI request determination manager 940, a request configuration manager 945, or any combination thereof. Each of these components may communicate, directly or indirectly, with one another (e.g., via one or more buses).

The communications manager 920 may support wireless communications at a UE in accordance with examples as disclosed herein. The base station detection manager 925 may be configured as or otherwise support a means for detecting a base station that is operating in an energy saving mode that includes the base station only transmitting RMSI on-demand. The RMSI request manager 930 may be configured as or otherwise support a means for transmitting a request for the base station to transmit the RMSI to the UE. The RMSI reception manager 935 may be configured as or otherwise support a means for receiving, from the base station and responsive to the request, a message including the RMSI.

In some examples, the RMSI request determination manager 940 may be configured as or otherwise support a means for receiving, from the energy saving base station, a synchronization signal block prior to transmitting the request. In some examples, the RMSI request determination manager 940 may be configured as or otherwise support a means for determining to perform a random access procedure with the energy saving base station based on the synchronization signal block.

In some examples, to support transmitting the request, the RMSI request determination manager 940 may be configured as or otherwise support a means for identifying a set of resources associated with the synchronization signal block. In some examples, to support transmitting the request, the RMSI request manager 930 may be configured as or otherwise support a means for transmitting, to the energy saving base station, the request for the RMSI using the set of resources.

In some examples, to support transmitting the request, the RMSI request manager 930 may be configured as or otherwise support a means for transmitting the request for the RMSI in accordance with a request configuration, the request configuration including a set of resources, a request type, or a combination thereof.

In some examples, the request configuration manager 945 may be configured as or otherwise support a means for receiving an indication of the request configuration from a serving base station of the UE or from the energy saving base station.

In some examples, the request configuration manager 945 may be configured as or otherwise support a means for receiving an indication of the request configuration in a master information block of a physical broadcast channel, in RRC signaling, in a system information block, a downlink control channel, or a combination thereof.

In some examples, to support transmitting the request, the RMSI request manager 930 may be configured as or otherwise support a means for transmitting a reference signal, a random access channel preamble, a random access channel, a physical uplink control channel, or a combination thereof indicating the request for the RMSI in accordance with the request type indicated by the request configuration.

In some examples, to support transmitting the request, the RMSI request manager 930 may be configured as or otherwise support a means for transmitting the request for the RMSI to a serving base station of the UE.

In some examples, the RMSI reception manager 935 may be configured as or otherwise support a means for receiving, from the serving base station, an indication to monitor for the RMSI from the energy saving base station, the indication including a set of resources for the UE to monitor for the RMSI.

In some examples, the RMSI request manager 930 may be configured as or otherwise support a means for receiving, from the energy saving base station, a downlink control channel indicating scheduled RMSI resources on a downlink shared channel, where transmitting the request is based on receiving the downlink control channel.

Figure 10:
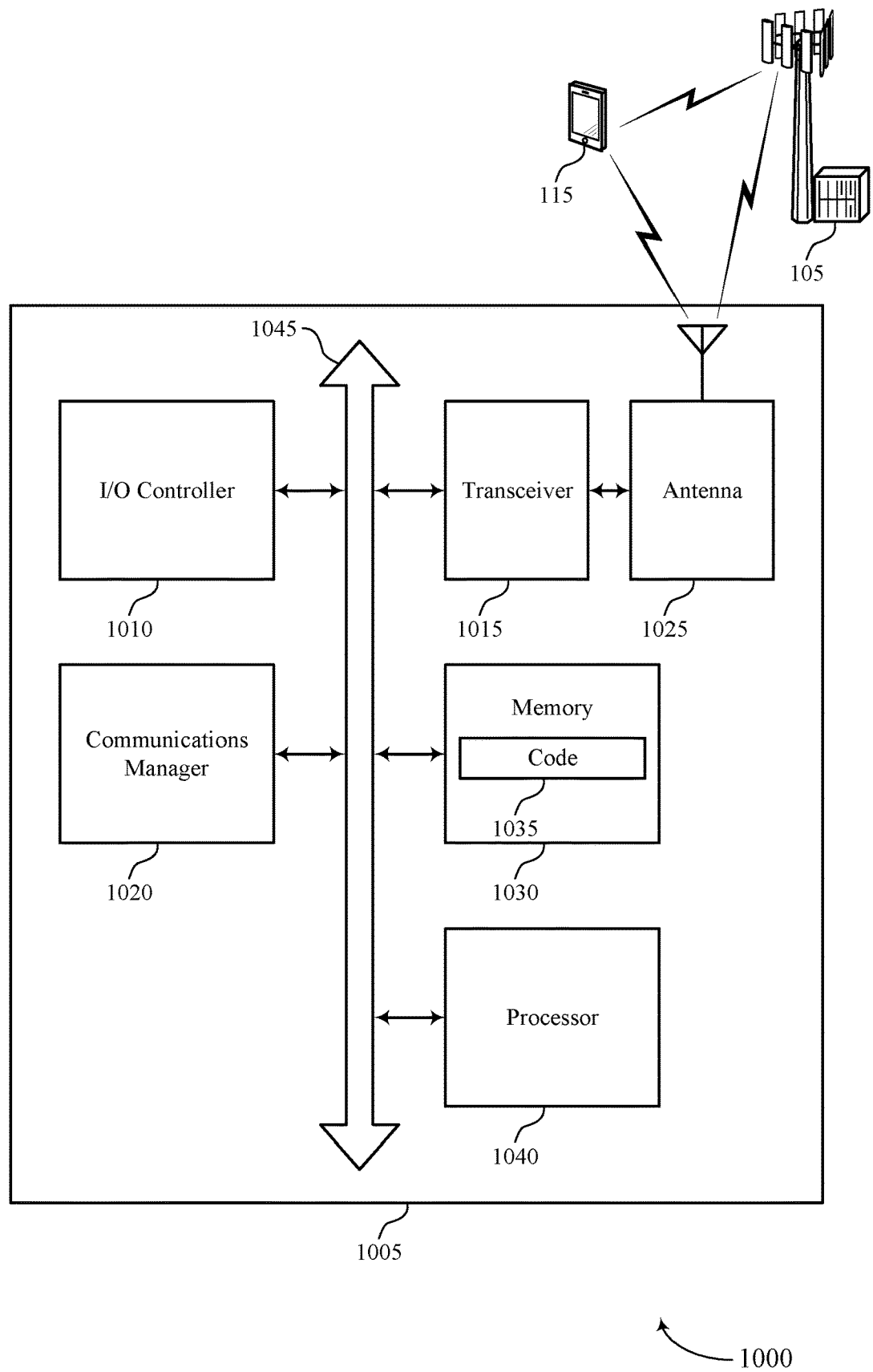
FIG. 10 shows a diagram of a system including a device that supports techniques for transmitting RMSI in accordance with aspects of the present disclosure.

FIG. 10 shows a diagram of a system 1000 including a device 1005 that supports techniques for transmitting RMSI in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for transmitting RMSI). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for detecting a base station that is operating in an energy saving mode that includes the base station only transmitting RMSI on-demand. The communications manager 1020 may be configured as or otherwise support a means for transmitting a request for the base station to transmit the RMSI to the UE. The communications manager 1020 may be configured as or otherwise support a means for receiving, from the base station and responsive to the request, a message including the RMSI.

By including or configuring the communications manager 1020 in accordance with examples as described herein, the device 1005 may support techniques for more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for transmitting RMSI as described herein, or the processor 1040 and the memory 1030 may be otherwise configured to perform or support such operations.

Figure 11:
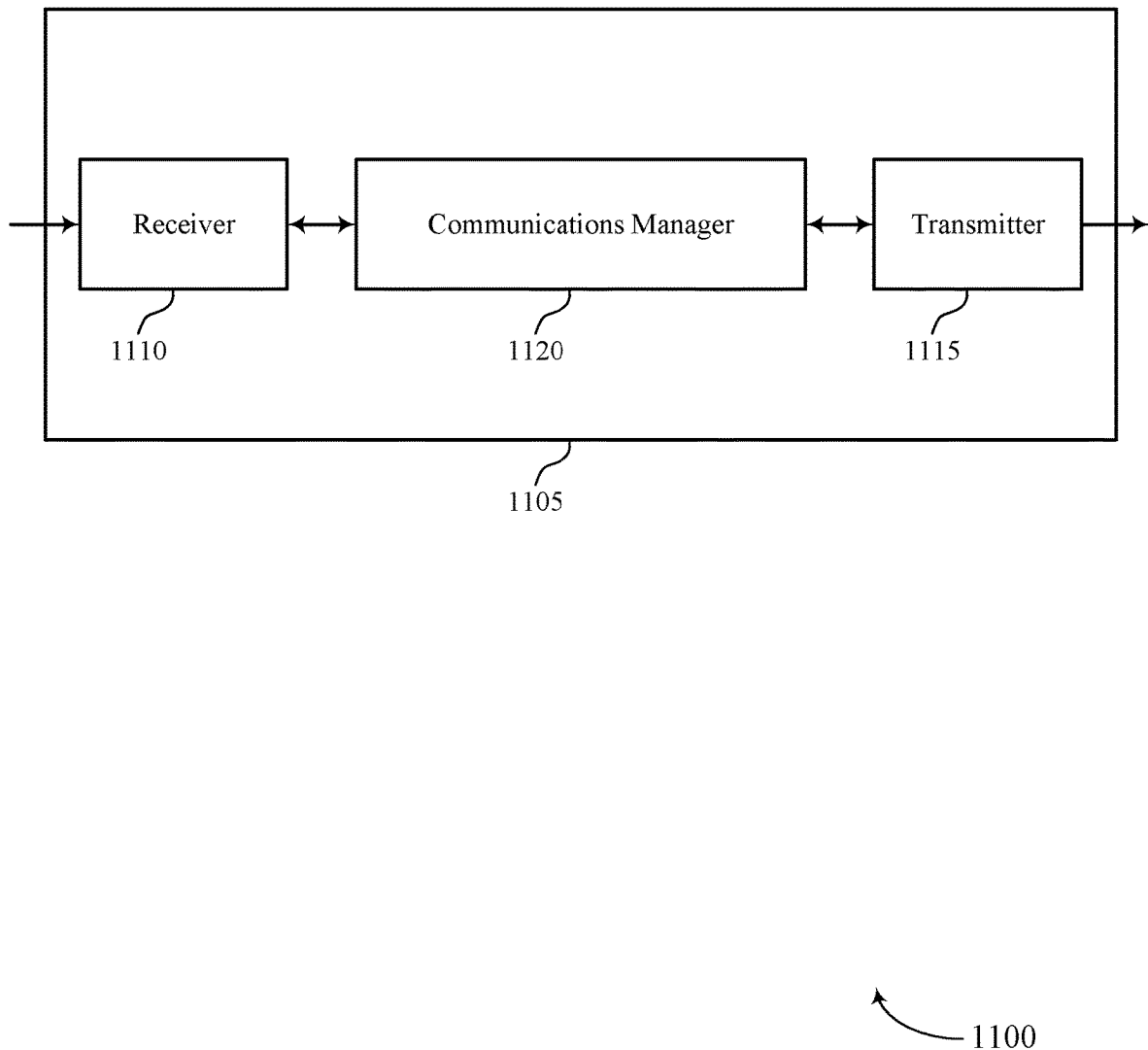
FIGS. 11 and 12 show block diagrams of devices that support techniques for transmitting RMSI in accordance with aspects of the present disclosure.

FIG. 11 shows a block diagram 1100 of a device 1105 that supports techniques for transmitting RMSI in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for transmitting RMSI). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for transmitting RMSI). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for transmitting RMSI as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for determining to operate in accordance with an energy saving mode in which the base station only transmits RMSI on-demand. The communications manager 1120 may be configured as or otherwise support a means for receiving a request to transmit the RMSI. The communications manager 1120 may be configured as or otherwise support a means for transmitting a message including the RMSI based on receiving the request.

Additionally or alternatively, the communications manager 1120 may support wireless communications at a first base station in accordance with examples as disclosed herein. For example, the communications manager 1120 may be configured as or otherwise support a means for establishing a connection with a UE. The communications manager 1120 may be configured as or otherwise support a means for receiving, from the UE, a request for RMSI from a second base station that is operating in an energy saving mode that includes the second base station only transmitting the RMSI on-demand. The communications manager 1120 may be configured as or otherwise support a means for relaying the request to the second base station based on receiving the request.

Additionally or alternatively, the communications manager 1120 may support wireless communications at a base station in accordance with examples as disclosed herein. For example, the communications manager 1120 may be configured as or otherwise support a means for determining to operate in accordance with an energy saving mode in which the base station reduces transmission of RMSI with respect to when the base station is operating outside of the energy saving mode. The communications manager 1120 may be configured as or otherwise support a means for identifying a configuration for transmitting RMSI in accordance with the energy saving mode. The communications manager 1120 may be configured as or otherwise support a means for transmitting RMSI in accordance with the configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, and more efficient utilization of communication resources.

Figure 12:
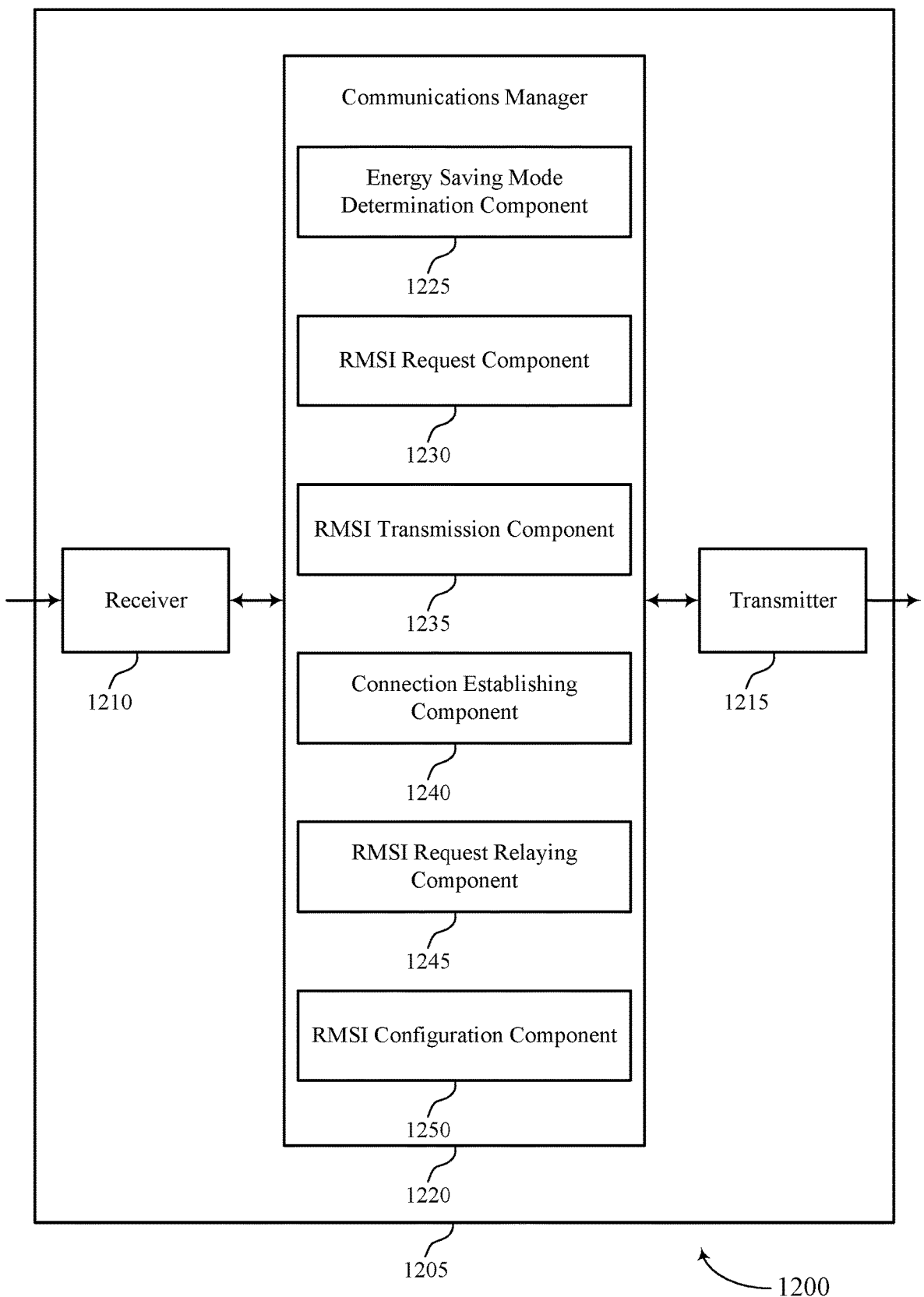

FIG. 12 shows a block diagram 1200 of a device 1205 that supports techniques for transmitting RMSI in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for transmitting RMSI). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for transmitting RMSI). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for transmitting RMSI as described herein. For example, the communications manager 1220 may include an energy saving mode determination component 1225, an RMSI request component 1230, an RMSI transmission component 1235, a connection establishing component 1240, an RMSI request relaying component 1245, an RMSI configuration component 1250, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The energy saving mode determination component 1225 may be configured as or otherwise support a means for determining to operate in accordance with an energy saving mode in which the base station only transmits RMSI on-demand. The RMSI request component 1230 may be configured as or otherwise support a means for receiving a request to transmit the RMSI. The RMSI transmission component 1235 may be configured as or otherwise support a means for transmitting a message including the RMSI based on receiving the request.

Additionally or alternatively, the communications manager 1220 may support wireless communications at a first base station in accordance with examples as disclosed herein. The connection establishing component 1240 may be configured as or otherwise support a means for establishing a connection with a UE. The RMSI request component 1230 may be configured as or otherwise support a means for receiving, from the UE, a request for RMSI from a second base station that is operating in an energy saving mode that includes the second base station only transmitting the RMSI on-demand. The RMSI request relaying component 1245 may be configured as or otherwise support a means for relaying the request to the second base station based on receiving the request.

Additionally or alternatively, the communications manager 1220 may support wireless communications at a base station in accordance with examples as disclosed herein. The energy saving mode determination component 1225 may be configured as or otherwise support a means for determining to operate in accordance with an energy saving mode in which the base station reduces transmission of RMSI with respect to when the base station is operating outside of the energy saving mode. The RMSI configuration component 1250 may be configured as or otherwise support a means for identifying a configuration for transmitting RMSI in accordance with the energy saving mode. The RMSI transmission component 1235 may be configured as or otherwise support a means for transmitting RMSI in accordance with the configuration.

Figure 13:
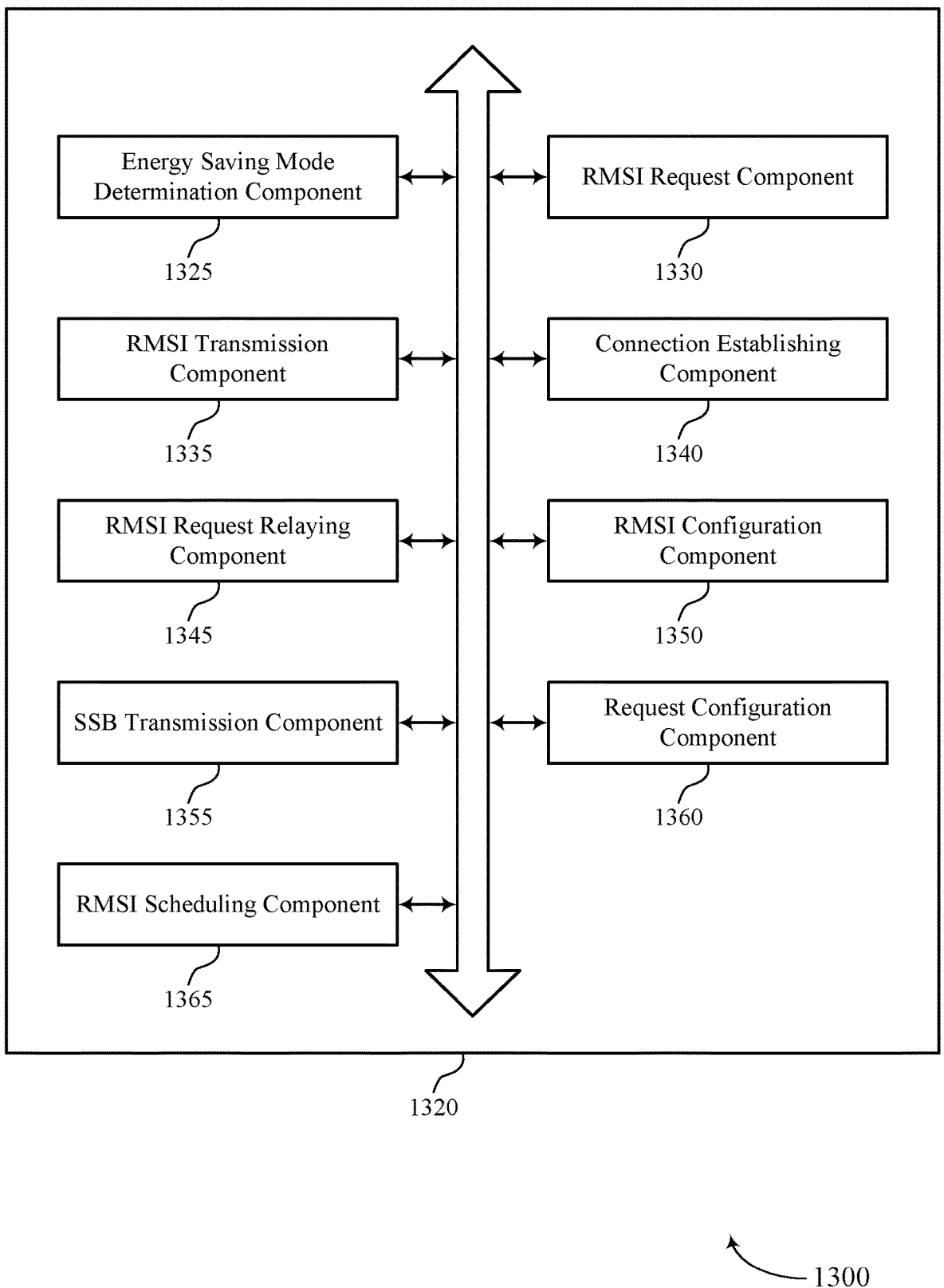
FIG. 13 shows a block diagram of a communications manager that supports techniques for transmitting RMSI in accordance with aspects of the present disclosure.

FIG. 13 shows a block diagram 1300 of a communications manager 1320 that supports techniques for transmitting RMSI in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for transmitting RMSI as described herein. For example, the communications manager 1320 may include an energy saving mode determination component 1325, an RMSI request component 1330, an RMSI transmission component 1335, a connection establishing component 1340, an RMSI request relaying component 1345, an RMSI configuration component 1350, an SSB transmission component 1355, a request configuration component 1360, an RMSI scheduling component 1365, or any combination thereof. Each of these components may communicate, directly or indirectly, with one another (e.g., via one or more buses).

The communications manager 1320 may support wireless communications at a base station in accordance with examples as disclosed herein. The energy saving mode determination component 1325 may be configured as or otherwise support a means for determining to operate in accordance with an energy saving mode in which the base station only transmits RMSI on-demand. The RMSI request component 1330 may be configured as or otherwise support a means for receiving a request to transmit the RMSI. The RMSI transmission component 1335 may be configured as or otherwise support a means for transmitting a message including the RMSI based on receiving the request.

In some examples, the SSB transmission component 1355 may be configured as or otherwise support a means for transmitting a set of synchronization signal blocks by beam sweeping the set of synchronization signal blocks in a set of multiple directions. In some examples, the RMSI request component 1330 may be configured as or otherwise support a means for receiving the request from a UE in a set of resources associated with a synchronization signal block from the set of synchronization signal blocks. In some examples, the RMSI transmission component 1335 may be configured as or otherwise support a means for transmitting the RMSI in a direction associated with the synchronization signal block.

In some examples, the RMSI transmission component 1335 may be configured as or otherwise support a means for transmitting the RMSI in a set of multiple directions based on receiving the request.

In some examples, to support receiving the request, the RMSI request component 1330 may be configured as or otherwise support a means for receiving, from a second base station, the request to transmit the RMSI, the request received via a backhaul link, an over-the-air transmission, or both.

In some examples, to support receiving the request, the RMSI request component 1330 may be configured as or otherwise support a means for receiving a reference signal, a random access channel preamble, a random access channel, a physical uplink control channel, or a combination thereof indicating the request for the RMSI.

In some examples, the request configuration component 1360 may be configured as or otherwise support a means for transmitting an indication of a request configuration for a second base station or UE to use to request for the RMSI, where the indication is included in a master information block of a physical broadcast channel, or a downlink control channel.

In some examples, the RMSI scheduling component 1365 may be configured as or otherwise support a means for transmitting a downlink control channel that schedules RMSI resources in a downlink shared channel before receiving the request. In some examples, the RMSI transmission component 1335 may be configured as or otherwise support a means for refraining from transmitting the RMSI until the base station receives the request.

In some examples, the RMSI scheduling component 1365 may be configured as or otherwise support a means for transmitting a downlink control channel that schedules RMSI resources in a downlink shared channel based on receiving the request.

In some examples, the RMSI request component 1330 may be configured as or otherwise support a means for monitoring for random access channel signals based on receiving the request.

Additionally or alternatively, the communications manager 1320 may support wireless communications at a first base station in accordance with examples as disclosed herein. The connection establishing component 1340 may be configured as or otherwise support a means for establishing a connection with a UE. In some examples, the RMSI request component 1330 may be configured as or otherwise support a means for receiving, from the UE, a request for RMSI from a second base station that is operating in an energy saving mode that includes the second base station only transmitting the RMSI on-demand. The RMSI request relaying component 1345 may be configured as or otherwise support a means for relaying the request to the second base station based on receiving the request.

In some examples, the request configuration component 1360 may be configured as or otherwise support a means for transmitting, to the UE, a request configuration for the UE to use to request the RMSI from the second base station, the request configuration indicating a set of resources, a request type, or a combination thereof.

In some examples, the request configuration component 1360 may be configured as or otherwise support a means for transmitting, to the UE, an indication to monitor for the RMSI from the second base station, the indication including a set of resources for the UE to monitor for the RMSI.

Additionally or alternatively, the communications manager 1320 may support wireless communications at a base station in accordance with examples as disclosed herein. In some examples, the energy saving mode determination component 1325 may be configured as or otherwise support a means for determining to operate in accordance with an energy saving mode in which the base station reduces transmission of RMSI with respect to when the base station is operating outside of the energy saving mode. The RMSI configuration component 1350 may be configured as or otherwise support a means for identifying a configuration for transmitting RMSI in accordance with the energy saving mode. In some examples, the RMSI transmission component 1335 may be configured as or otherwise support a means for transmitting RMSI in accordance with the configuration.

In some examples, to support transmitting the RMSI, the RMSI transmission component 1335 may be configured as or otherwise support a means for transmitting the RMSI in a first set of directions for a first duration and the RMSI in a second set of directions for a second duration in accordance with the configuration. In some examples, to support transmitting the RMSI, the RMSI transmission component 1335 may be configured as or otherwise support a means for transmitting, after a number of durations, the RMSI in the first set of directions for the first duration in accordance with the configuration.

In some examples, the RMSI configuration component 1350 may be configured as or otherwise support a means for transmitting an indication of a pattern for receiving the RMSI.

In some examples, to support transmitting the indication, the RMSI configuration component 1350 may be configured as or otherwise support a means for transmitting a message indicating a set of directions the base station will transmit the RMSI in accordance with the pattern.

In some examples, the message includes a bitmap indicating the set of directions the base station will transmit the RMSI and a second set of directions that the base station will refrain from transmitting the RMSI.

In some examples, the message includes a time interval for receiving the RMSI in each direction of the set of directions.

In some examples, the message includes an index associated with each direction of the set of directions.

In some examples, to support transmitting the indication, the RMSI configuration component 1350 may be configured as or otherwise support a means for transmitting a primary synchronization signal, a secondary synchronization signal, a demodulation reference signal, a master information block, a physical broadcast channel, a RRC signal, or a combination thereof including the indication.

Figure 14:
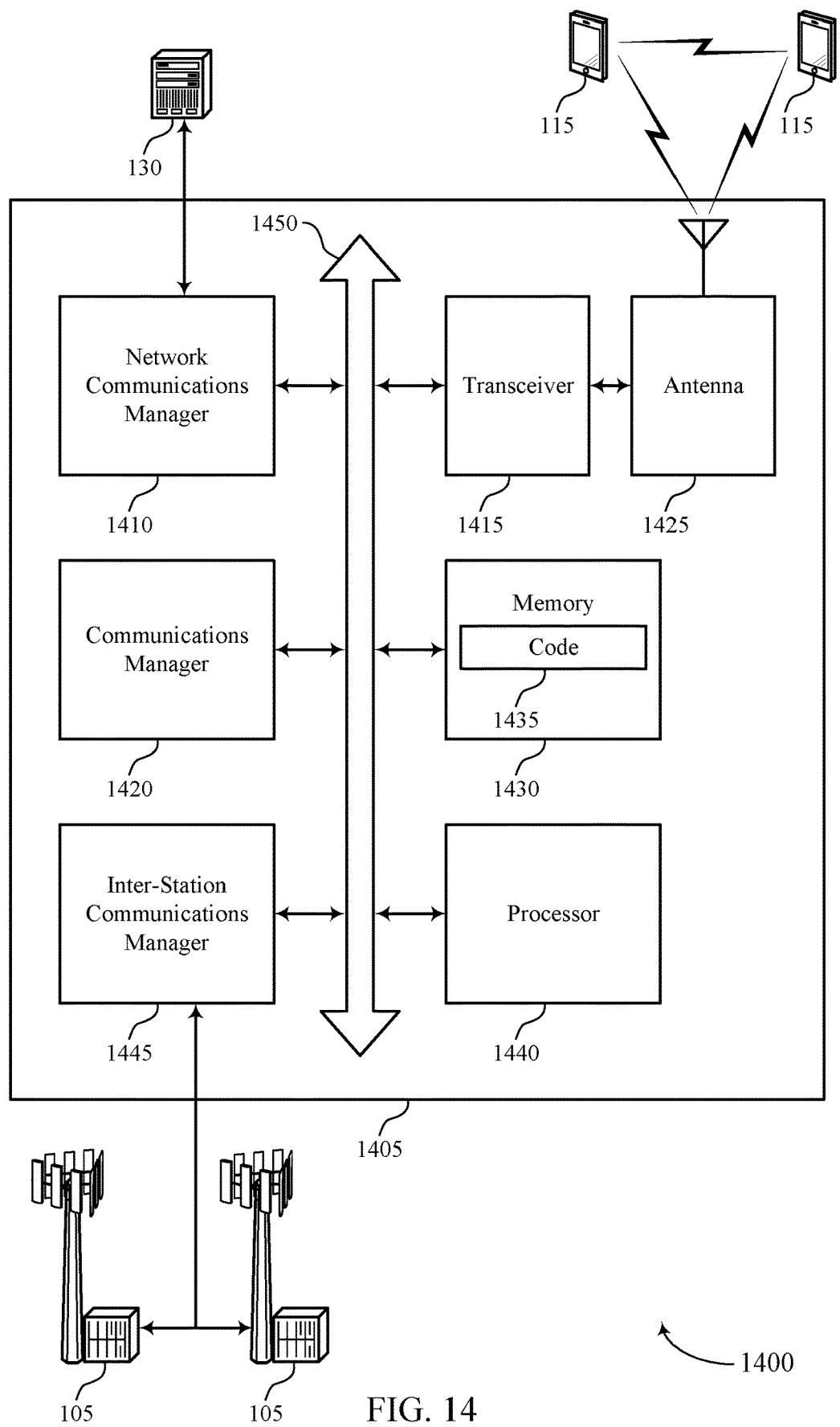
FIG. 14 shows a diagram of a system including a device that supports techniques for transmitting RMSI in accordance with aspects of the present disclosure.

FIG. 14 shows a diagram of a system 1400 including a device 1405 that supports techniques for transmitting RMSI in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for transmitting RMSI). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for determining to operate in accordance with an energy saving mode in which the base station only transmits RMSI on-demand. The communications manager 1420 may be configured as or otherwise support a means for receiving a request to transmit the RMSI. The communications manager 1420 may be configured as or otherwise support a means for transmitting a message including the RMSI based on receiving the request.

Additionally or alternatively, the communications manager 1420 may support wireless communications at a first base station in accordance with examples as disclosed herein. For example, the communications manager 1420 may be configured as or otherwise support a means for establishing a connection with a UE. The communications manager 1420 may be configured as or otherwise support a means for receiving, from the UE, a request for RMSI from a second base station that is operating in an energy saving mode that includes the second base station only transmitting the RMSI on-demand. The communications manager 1420 may be configured as or otherwise support a means for relaying the request to the second base station based on receiving the request.

Additionally or alternatively, the communications manager 1420 may support wireless communications at a base station in accordance with examples as disclosed herein. For example, the communications manager 1420 may be configured as or otherwise support a means for determining to operate in accordance with an energy saving mode in which the base station reduces transmission of RMSI with respect to when the base station is operating outside of the energy saving mode. The communications manager 1420 may be configured as or otherwise support a means for identifying a configuration for transmitting RMSI in accordance with the energy saving mode. The communications manager 1420 may be configured as or otherwise support a means for transmitting RMSI in accordance with the configuration.

By including or configuring the communications manager 1420 in accordance with examples as described herein, the device 1405 may support techniques for reduced power consumption, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for transmitting RMSI as described herein, or the processor 1440 and the memory 1430 may be otherwise configured to perform or support such operations.

Figure 15:
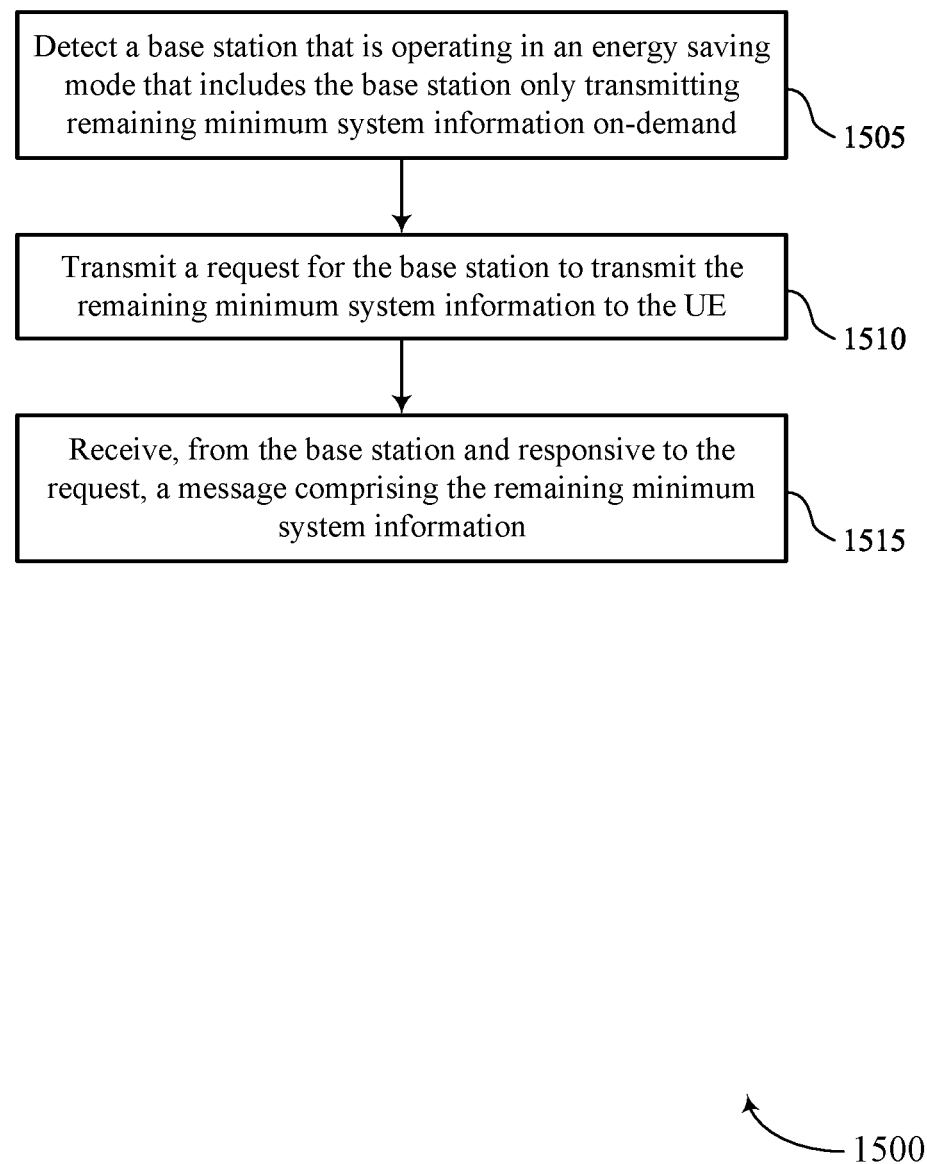
FIGS. 15 through 18 show flowcharts illustrating methods that support techniques for transmitting RMSI in accordance with aspects of the present disclosure.

FIG. 15 shows a flowchart illustrating a method 1500 that supports techniques for transmitting RMSI in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include detecting a base station that is operating in an energy saving mode that includes the base station only transmitting RMSI on-demand. The operations of 1505 may be performed in accordance with examples as disclosed herein. In some examples, aspects of the operations of 1505 may be performed by a base station detection manager 925 as described with reference to FIG. 9.

At 1510, the method may include transmitting a request for the base station to transmit the RMSI to the UE. The operations of 1510 may be performed in accordance with examples as disclosed herein. In some examples, aspects of the operations of 1510 may be performed by an RMSI request manager 930 as described with reference to FIG. 9.

At 1515, the method may include receiving, from the base station and responsive to the request, a message including the RMSI. The operations of 1515 may be performed in accordance with examples as disclosed herein. In some examples, aspects of the operations of 1515 may be performed by an RMSI reception manager 935 as described with reference to FIG. 9.

Figure 16:
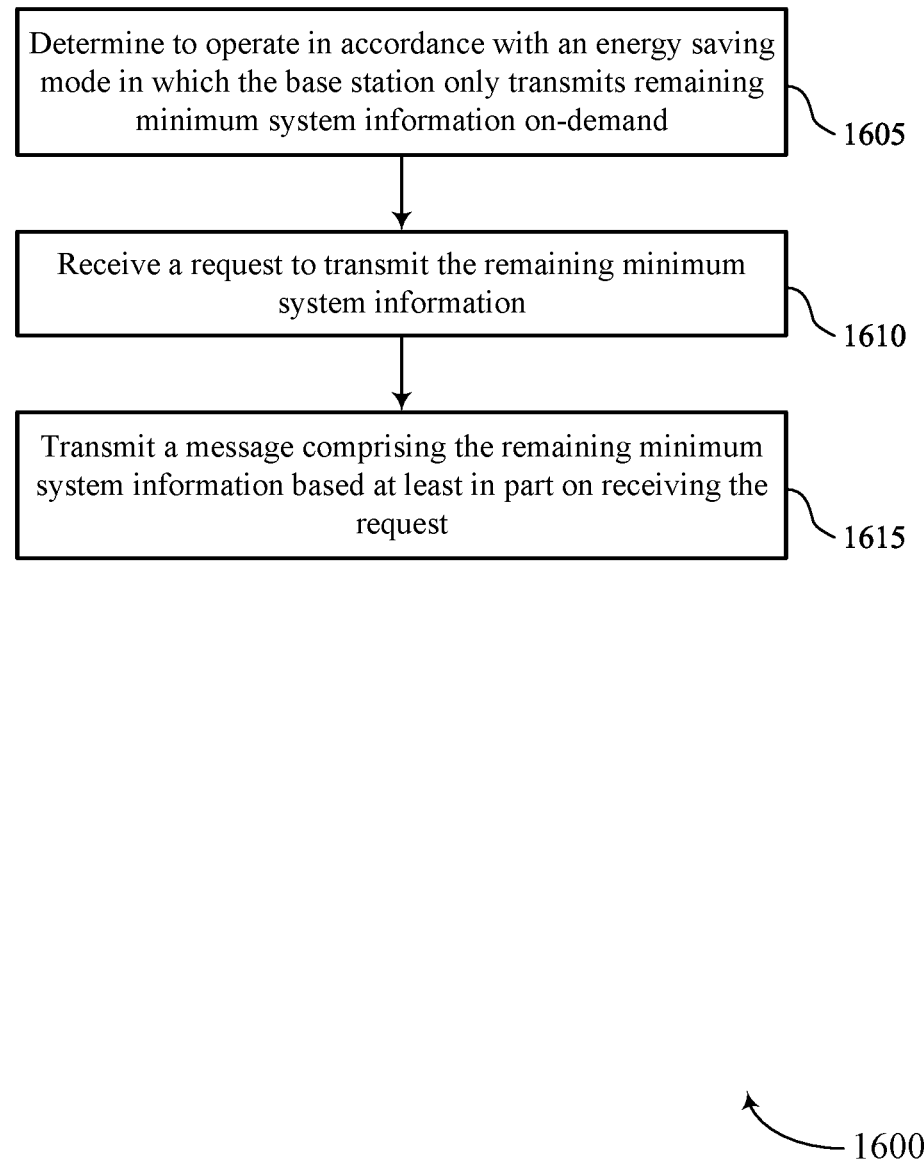

FIG. 16 shows a flowchart illustrating a method 1600 that supports techniques for transmitting RMSI in accordance with aspects of the present disclosure. The operations of the method 1600 may be implemented by a base station or its components as described herein. For example, the operations of the method 1600 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1605, the method may include determining to operate in accordance with an energy saving mode in which the base station only transmits RMSI on-demand. The operations of 1605 may be performed in accordance with examples as disclosed herein. In some examples, aspects of the operations of 1605 may be performed by an energy saving mode determination component 1325 as described with reference to FIG. 13.

At 1610, the method may include receiving a request to transmit the RMSI. The operations of 1610 may be performed in accordance with examples as disclosed herein. In some examples, aspects of the operations of 1610 may be performed by an RMSI request component 1330 as described with reference to FIG. 13.

At 1615, the method may include transmitting a message including the RMSI based on receiving the request. The operations of 1615 may be performed in accordance with examples as disclosed herein. In some examples, aspects of the operations of 1615 may be performed by an RMSI transmission component 1335 as described with reference to FIG. 13.

Figure 17:
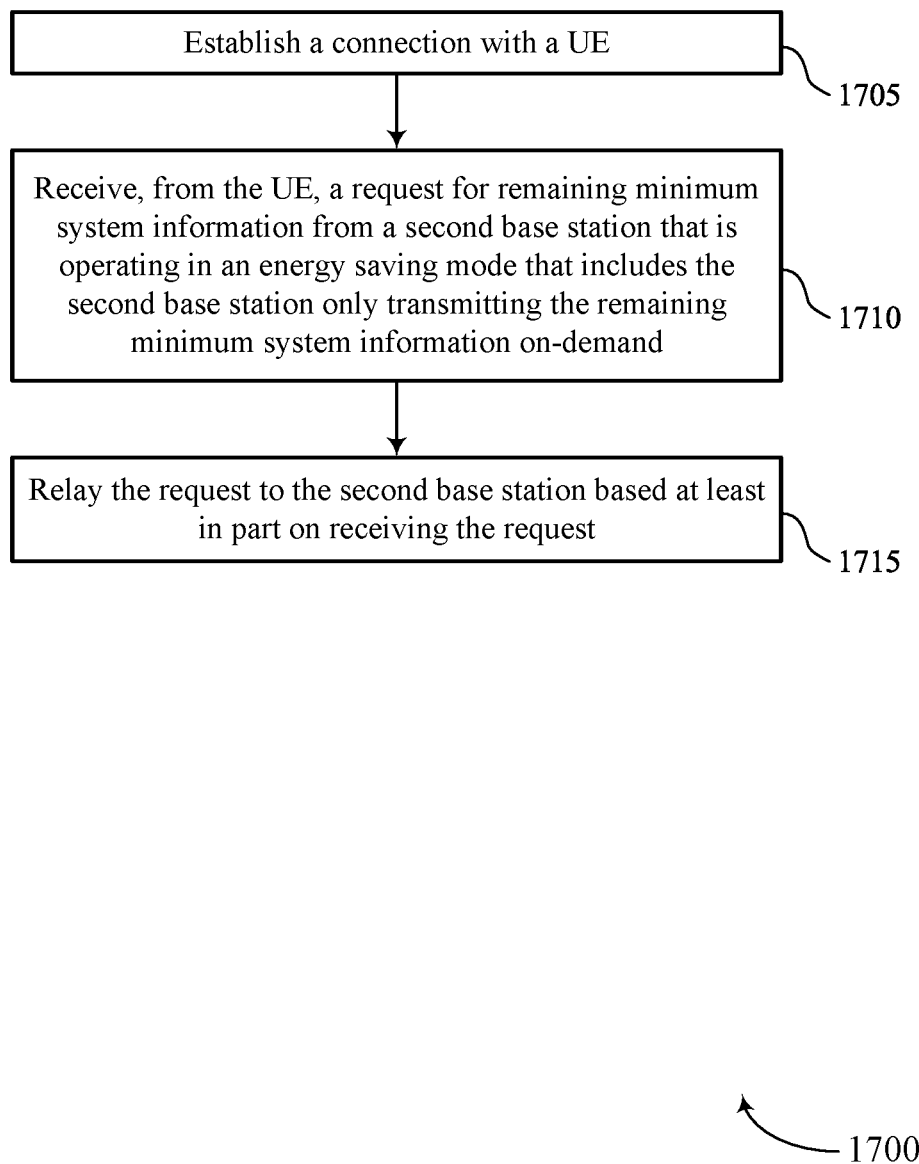

FIG. 17 shows a flowchart illustrating a method 1700 that supports techniques for transmitting RMSI in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include establishing a connection with a UE. The operations of 1705 may be performed in accordance with examples as disclosed herein. In some examples, aspects of the operations of 1705 may be performed by a connection establishing component 1340 as described with reference to FIG. 13.

At 1710, the method may include receiving, from the UE, a request for RMSI from a second base station that is operating in an energy saving mode that includes the second base station only transmitting the RMSI on-demand. The operations of 1710 may be performed in accordance with examples as disclosed herein. In some examples, aspects of the operations of 1710 may be performed by an RMSI request component 1330 as described with reference to FIG. 13.

At 1715, the method may include relaying the request to the second base station based on receiving the request. The operations of 1715 may be performed in accordance with examples as disclosed herein. In some examples, aspects of the operations of 1715 may be performed by an RMSI request relaying component 1345 as described with reference to FIG. 13.

Figure 18:
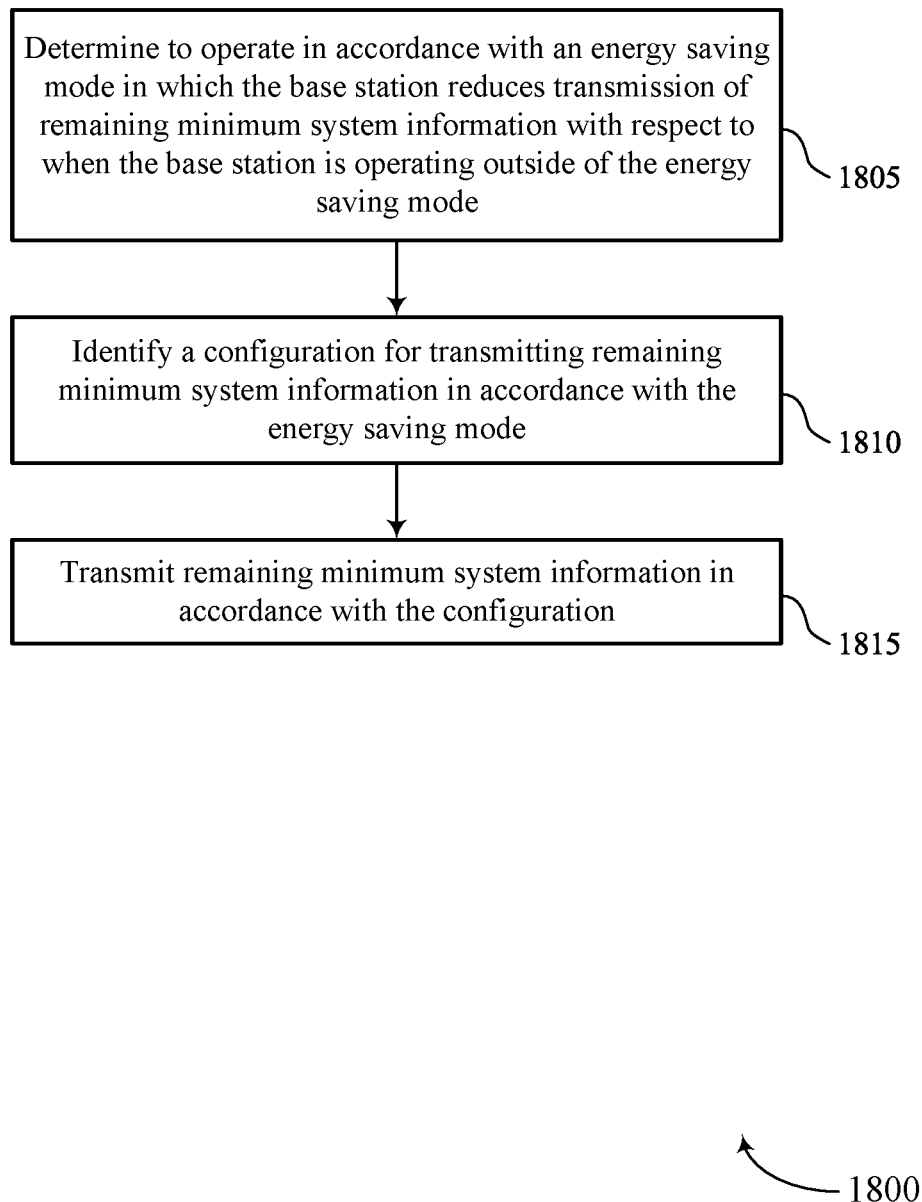

FIG. 18 shows a flowchart illustrating a method 1800 that supports techniques for transmitting RMSI in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include determining to operate in accordance with an energy saving mode in which the base station reduces transmission of RMSI with respect to when the base station is operating outside of the energy saving mode. The operations of 1805 may be performed in accordance with examples as disclosed herein. In some examples, aspects of the operations of 1805 may be performed by an energy saving mode determination component 1325 as described with reference to FIG. 13.

At 1810, the method may include identifying a configuration for transmitting RMSI in accordance with the energy saving mode. The operations of 1810 may be performed in accordance with examples as disclosed herein. In some examples, aspects of the operations of 1810 may be performed by an RMSI configuration component 1350 as described with reference to FIG. 13.

At 1815, the method may include transmitting RMSI in accordance with the configuration. The operations of 1815 may be performed in accordance with examples as disclosed herein. In some examples, aspects of the operations of 1815 may be performed by an RMSI transmission component 1335 as described with reference to FIG. 13.

The following provides an overview of aspects of the present disclosure:

Aspect 1: A method for wireless communications at a UE, comprising: detecting a base station that is operating in an energy saving mode that includes the base station only transmitting remaining minimum system information on-demand; transmitting a request for the base station to transmit the remaining minimum system information to the UE; and receiving, from the base station and responsive to the request, a message comprising the remaining minimum system information.

Aspect 2: The method of aspect 1, further comprising: receiving, from the energy saving base station, a synchronization signal block prior to transmitting the request; and determining to perform a random access procedure with the energy saving base station based at least in part on the synchronization signal block.

Aspect 3: The method of aspect 2, wherein transmitting the request further comprises: identifying a set of resources associated with the synchronization signal block; and transmitting, to the energy saving base station, the request for the remaining minimum system information using the set of resources.

Aspect 4: The method of any of aspects 1 through 3, wherein transmitting the request further comprises: transmitting the request for the remaining minimum system information in accordance with a request configuration, the request configuration comprising a set of resources, a request type, or a combination thereof.

Aspect 5: The method of aspect 4, further comprising: receiving an indication of the request configuration from a serving base station of the UE or from the energy saving base station.

Aspect 6: The method of any of aspects 4 through 5, further comprising: receiving an indication of the request configuration in a master information block of a physical broadcast channel, in radio resource control signaling, in a system information block, a downlink control channel, or a combination thereof.

Aspect 7: The method of any of aspects 4 through 6, wherein transmitting the request further comprises: transmitting a reference signal, a random access channel preamble, a random access channel, a physical uplink control channel, or a combination thereof indicating the request for the remaining minimum system information in accordance with the request type indicated by the request configuration.

Aspect 8: The method of any of aspects 1 through 7, wherein transmitting the request further comprises: transmitting the request for the remaining minimum system information to a serving base station of the UE.

Aspect 9: The method of aspect 8, further comprising: receiving, from the serving base station, an indication to monitor for the remaining minimum system information from the energy saving base station, the indication comprising a set of resources for the UE to monitor for the remaining minimum system information.

Aspect 10: The method of any of aspects 1 through 9, further comprising: receiving, from the energy saving base station, a downlink control channel indicating scheduled remaining minimum system information resources on a downlink shared channel, wherein transmitting the request is based at least in part on receiving the downlink control channel.

Aspect 11: A method for wireless communications at a base station, comprising: determining to operate in accordance with an energy saving mode in which the base station only transmits remaining minimum system information on-demand; receiving a request to transmit the remaining minimum system information; and transmitting a message comprising the remaining minimum system information based at least in part on receiving the request.

Aspect 12: The method of aspect 11, further comprising: transmitting a set of synchronization signal blocks by beam sweeping the set of synchronization signal blocks in a plurality of directions; receiving the request from a UE in a set of resources associated with a synchronization signal block from the set of synchronization signal blocks; and transmitting the remaining minimum system information in a direction associated with the synchronization signal block.

Aspect 13: The method of any of aspects 11 through 12, further comprising: transmitting the remaining minimum system information in a plurality of directions based at least in part on receiving the request.

Aspect 14: The method of any of aspects 11 through 13, wherein receiving the request further comprises: receiving, from a second base station, the request to transmit the remaining minimum system information, the request received via a backhaul link, an over-the-air transmission, or both.

Aspect 15: The method of any of aspects 11 through 14, wherein receiving the request further comprises: receiving a reference signal, a random access channel preamble, a random access channel, a physical uplink control channel, or a combination thereof indicating the request for the remaining minimum system information.

Aspect 16: The method of any of aspects 11 through 15, further comprising: transmitting an indication of a request configuration for a second base station or UE to use to request for the remaining minimum system information, where the indication is included in a master information block of a physical broadcast channel, or a downlink control channel.

Aspect 17: The method of any of aspects 11 through 16, further comprising: transmitting a downlink control channel that schedules remaining minimum system information resources in a downlink shared channel before receiving the request; and refraining from transmitting the remaining minimum system information until the base station receives the request.

Aspect 18: The method of any of aspects 11 through 17, further comprising: transmitting a downlink control channel that schedules remaining minimum system information resources in a downlink shared channel based at least in part on receiving the request.

Aspect 19: The method of any of aspects 11 through 18, further comprising: monitoring for random access channel signals based at least in part on receiving the request.

Aspect 20: A method for wireless communications at a first base station, comprising: establishing a connection with a UE; receiving, from the UE, a request for remaining minimum system information from a second base station that is operating in an energy saving mode that includes the second base station only transmitting the remaining minimum system information on-demand; and relaying the request to the second base station based at least in part on receiving the request.

Aspect 21: The method of aspect 20, further comprising: transmitting, to the UE, a request configuration for the UE to use to request the remaining minimum system information from the second base station, the request configuration indicating a set of resources, a request type, or a combination thereof.

Aspect 22: The method of any of aspects 20 through 21, further comprising: transmitting, to the UE, an indication to monitor for the remaining minimum system information from the second base station, the indication comprising a set of resources for the UE to monitor for the remaining minimum system information.

Aspect 23: A method for wireless communications at a base station, comprising: determining to operate in accordance with an energy saving mode in which the base station reduces transmission of remaining minimum system information with respect to when the base station is operating outside of the energy saving mode; identifying a configuration for transmitting remaining minimum system information in accordance with the energy saving mode; and transmitting remaining minimum system information in accordance with the configuration.

Aspect 24: The method of aspect 23, wherein transmitting the remaining minimum system information further comprises: transmitting the remaining minimum system information in a first set of directions for a first duration and the remaining minimum system information in a second set of directions for a second duration in accordance with the configuration; and transmitting, after a number of durations, the remaining minimum system information in the first set of directions for the first duration in accordance with the configuration.

Aspect 25: The method of any of aspects 23 through 24, further comprising: transmitting an indication of a pattern for receiving the remaining minimum system information.

Aspect 26: The method of aspect 25, wherein transmitting the indication further comprises: transmitting a message indicating a set of directions the base station will transmit the remaining minimum system information in accordance with the pattern.

Aspect 27: The method of aspect 26, wherein the message comprises a bitmap indicating the set of directions the base station will transmit the remaining minimum system information and a second set of directions that the base station will refrain from transmitting the remaining minimum system information.

Aspect 28: The method of any of aspects 26 through 27, wherein the message comprises a time interval for receiving the remaining minimum system information in each direction of the set of directions.

Aspect 29: The method of any of aspects 26 through 28, wherein the message comprises an index associated with each direction of the set of directions.

Aspect 30: The method of any of aspects 25 through 29, wherein transmitting the indication further comprises: transmitting a primary synchronization signal, a secondary synchronization signal, a demodulation reference signal, a master information block, a physical broadcast channel, a radio resource control signal, or a combination thereof comprising the indication.

Aspect 31: An apparatus for wireless communications at a UE, comprising a processor; memory coupled with the processor; and instructions stored in the memory and executable by the processor to cause the apparatus to perform a method of any of aspects 1 through 10.

Aspect 32: An apparatus for wireless communications at a UE, comprising at least one means for performing a method of any of aspects 1 through 10.

Aspect 33: A non-transitory computer-readable medium storing code for wireless communications at a UE, the code comprising instructions executable by a processor to perform a method of any of aspects 1 through 10.

Aspect 34: An apparatus for wireless communications at a base station, comprising a processor; memory coupled with the processor; and instructions stored in the memory and executable by the processor to cause the apparatus to perform a method of any of aspects 11 through 19.

Aspect 35: An apparatus for wireless communications at a base station, comprising at least one means for performing a method of any of aspects 11 through 19.

Aspect 36: A non-transitory computer-readable medium storing code for wireless communications at a base station, the code comprising instructions executable by a processor to perform a method of any of aspects 11 through 19.

Aspect 37: An apparatus for wireless communications at a first base station, comprising a processor; memory coupled with the processor; and instructions stored in the memory and executable by the processor to cause the apparatus to perform a method of any of aspects 20 through 22.

Aspect 38: An apparatus for wireless communications at a first base station, comprising at least one means for performing a method of any of aspects 20 through 22.

Aspect 39: A non-transitory computer-readable medium storing code for wireless communications at a first base station, the code comprising instructions executable by a processor to perform a method of any of aspects 20 through 22.

Aspect 40: An apparatus for wireless communications at a base station, comprising a processor; memory coupled with the processor; and instructions stored in the memory and executable by the processor to cause the apparatus to perform a method of any of aspects 23 through 30.

Aspect 41: An apparatus for wireless communications at a base station, comprising at least one means for performing a method of any of aspects 23 through 30.

Aspect 42: A non-transitory computer-readable medium storing code for wireless communications at a base station, the code comprising instructions executable by a processor to perform a method of any of aspects 23 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   detecting a base station that is operating in an energy saving mode that includes the base station only transmitting remaining minimum system information on-demand;
   transmitting a request for the base station to transmit the remaining minimum system information to the UE; and
   receiving, from the base station and responsive to the request, a message comprising the remaining minimum system information.

2. The method of claim 1, further comprising:
   receiving, from the energy saving base station, a synchronization signal block prior to transmitting the request; and
   determining to perform a random access procedure with the energy saving base station based at least in part on the synchronization signal block.

3. The method of claim 2, wherein transmitting the request further comprises:
   identifying a set of resources associated with the synchronization signal block; and
   transmitting, to the energy saving base station, the request for the remaining minimum system information using the set of resources.

4. The method of claim 1, wherein transmitting the request further comprises:
   transmitting the request for the remaining minimum system information in accordance with a request configuration, the request configuration comprising a set of resources, a request type, or a combination thereof.

5. The method of claim 4, further comprising:
   receiving an indication of the request configuration from a serving base station of the UE or from the energy saving base station.

6. The method of claim 4, further comprising:
   receiving an indication of the request configuration in a master information block of a physical broadcast channel, in radio resource control signaling, in a system information block, a downlink control channel, or a combination thereof.

7. The method of claim 4, wherein transmitting the request further comprises:
   transmitting a reference signal, a random access channel preamble, a random access channel, a physical uplink control channel, or a combination thereof indicating the request for the remaining minimum system information in accordance with the request type indicated by the request configuration.

8. The method of claim 1, wherein transmitting the request further comprises:
   transmitting the request for the remaining minimum system information to a serving base station of the UE.

9. The method of claim 8, further comprising:
   receiving, from the serving base station, an indication to monitor for the remaining minimum system information from the energy saving base station, the indication comprising a set of resources for the UE to monitor for the remaining minimum system information.

10. The method of claim 1, further comprising:
    receiving, from the energy saving base station, a downlink control channel indicating scheduled remaining minimum system information resources on a downlink shared channel, wherein transmitting the request is based at least in part on receiving the downlink control channel.

11. A method for wireless communications at a base station, comprising:
    determining to operate in accordance with an energy saving mode in which the base station only transmits remaining minimum system information on-demand;
    receiving a request to transmit the remaining minimum system information; and
    transmitting a message comprising the remaining minimum system information based at least in part on receiving the request.

12. The method of claim 11, further comprising:
    transmitting a set of synchronization signal blocks by beam sweeping the set of synchronization signal blocks in a plurality of directions;
    receiving the request from a user equipment (UE) in a set of resources associated with a synchronization signal block from the set of synchronization signal blocks; and
    transmitting the remaining minimum system information in a direction associated with the synchronization signal block.

13. The method of claim 11, further comprising:
    transmitting the remaining minimum system information in a plurality of directions based at least in part on receiving the request.

14. The method of claim 11, wherein receiving the request further comprises:
    receiving, from a second base station, the request to transmit the remaining minimum system information, the request received via a backhaul link, an over-the-air transmission, or both.

15. The method of claim 11, wherein receiving the request further comprises:
    receiving a reference signal, a random access channel preamble, a random access channel, a physical uplink control channel, or a combination thereof indicating the request for the remaining minimum system information.

16. The method of claim 11, further comprising:
    transmitting an indication of a request configuration for a second base station or UE to use to request for the remaining minimum system information, where the indication is included in a master information block of a physical broadcast channel, or a downlink control channel.

17. The method of claim 11, further comprising:
    transmitting a downlink control channel that schedules remaining minimum system information resources in a downlink shared channel before receiving the request; and
    refraining from transmitting the remaining minimum system information until the base station receives the request.

18. The method of claim 11, further comprising:
    transmitting a downlink control channel that schedules remaining minimum system information resources in a downlink shared channel based at least in part on receiving the request.

19. The method of claim 11, further comprising:
    monitoring for random access channel signals based at least in part on receiving the request.

20. A method for wireless communications at a first base station, comprising:
    establishing a connection with a user equipment (UE);

receiving, from the UE, a request for remaining minimum system information from a second base station that is operating in an energy saving mode that includes the second base station only transmitting the remaining minimum system information on-demand; and relaying the request to the second base station based at least in part on receiving the request.

21. The method of claim 20, further comprising:

transmitting, to the UE, a request configuration for the UE to use to request the remaining minimum system information from the second base station, the request configuration indicating a set of resources, a request type, or a combination thereof.

22. The method of claim 20, further comprising:

transmitting, to the UE, an indication to monitor for the remaining minimum system information from the second base station, the indication comprising a set of resources for the UE to monitor for the remaining minimum system information.

23. An apparatus for wireless communications at a user equipment (UE), comprising:

a processor;

memory coupled with the processor; and instructions stored in the memory and executable by the processor to cause the apparatus to:

detect a base station that is operating in an energy saving mode that includes the base station only transmitting remaining minimum system information on-demand;

transmit a request for the base station to transmit the remaining minimum system information to the UE; and receive, from the base station and responsive to the request, a message comprising the remaining minimum system information.

24. The apparatus of claim 23, wherein the instructions are further executable by the processor to cause the apparatus to:

receive, from the energy saving base station, a synchronization signal block prior to transmitting the request; and determine to perform a random access procedure with the energy saving base station based at least in part on the synchronization signal block.

25. The apparatus of claim 24, wherein the instructions to transmit the request are further executable by the processor to cause the apparatus to:

identify a set of resources associated with the synchronization signal block; and transmit, to the energy saving base station, the request for the remaining minimum system information using the set of resources.

26. The apparatus of claim 23, wherein the instructions to transmit the request are further executable by the processor to cause the apparatus to:

transmit the request for the remaining minimum system information in accordance with a request configuration, the request configuration comprising a set of resources, a request type, or a combination thereof.

27. The apparatus of claim 26, wherein the instructions are further executable by the processor to cause the apparatus to:

receive an indication of the request configuration from a serving base station of the UE or from the energy saving base station.

28. The apparatus of claim 26, wherein the instructions are further executable by the processor to cause the apparatus to:

receive an indication of the request configuration in a master information block of a physical broadcast channel, in radio resource control signaling, in a system information block, a downlink control channel, or a combination thereof.

29. The apparatus of claim 26, wherein the instructions to transmit the request are further executable by the processor to cause the apparatus to:

transmit a reference signal, a random access channel preamble, a random access channel, a physical uplink control channel, or a combination thereof indicating the request for the remaining minimum system information in accordance with the request type indicated by the request configuration.

30. The apparatus of claim 23, wherein the instructions to transmit the request are further executable by the processor to cause the apparatus to:

transmit the request for the remaining minimum system information to a serving base station of the UE.

* * * * *